US011334035B2

(12) United States Patent
Subbloie et al.

(10) Patent No.: US 11,334,035 B2
(45) Date of Patent: May 17, 2022

(54) MACHINE LEARNING APPLICATION TO PREDICTIVE ENERGY MANAGEMENT

(71) Applicant: Budderfly, Inc., Shelton, CT (US)

(72) Inventors: Albert Subbloie, Orange, CT (US); Christopher J. DeBenedictis, Branford, CT (US); Jaan Leemet, Aventura, FL (US); Kenneth Buda, Scarsdale, NY (US)

(73) Assignee: Budderfly, Inc., Shelton, CT (US)

( * ) Notice: Subject to any disclaimer, the term of this patent is extended or adjusted under 35 U.S.C. 154(b) by 0 days.

(21) Appl. No.: 17/110,961

(22) Filed: Dec. 3, 2020

(65) Prior Publication Data

US 2021/0173358 A1 Jun. 10, 2021

Related U.S. Application Data

(60) Provisional application No. 62/943,618, filed on Dec. 4, 2019.

(51) Int. Cl.
*G05B 13/02* (2006.01)
*G01R 19/165* (2006.01)
(Continued)

(52) U.S. Cl.
CPC ... *G05B 13/0265* (2013.01); *G01R 19/16571* (2013.01); *G05B 13/026* (2013.01); *H02H 1/0007* (2013.01); *H02H 7/20* (2013.01)

(58) Field of Classification Search
CPC .............. G05B 13/0265; G05B 13/026; G05B 2219/2639; G05B 23/0254; G01R 19/16571; H02H 1/0007; H02H 7/20
See application file for complete search history.

(56) References Cited

U.S. PATENT DOCUMENTS 10,690,556 B1 * 6/2020 Quintana .............. H02H 7/0833
10,816,430 B1 * 10/2020 Jerphagnon ............ G01R 21/00
(Continued)

OTHER PUBLICATIONS

Luo, Dong, et al. "Monitoring HVAC equipment electrical loads from a centralized location-methods and field test results." ASHRAE Transactions 108.1 (2002): 841-857. (Year: 2002).*
(Continued)

*Primary Examiner* — Michael D Masinick
(74) *Attorney, Agent, or Firm* — St. Onge Steward Johnston & Reens LLC

(57) ABSTRACT

A system for automatically learning and adapting to the energy usage of an equipment operating according to a control input including at least one sensor for measuring an energy usage of the equipment an generating a baseline energy usage over time signature that is used to compare active energy usage measurements to so as to determine operational deviations. The system includes software that matches and compares equipment operation to established norms and can modify the functioning of the equipment when threshold deviations are detected. The system includes the ability to learn the functioning of the equipment and can adjust for dynamically changing conditions to avoid generation of false alerts or alarms while at the same time detecting longer term deviations that if left unchecked, could shorten the lifespan of the equipment and increase the costs associated with running the equipment.

24 Claims, 12 Drawing Sheets shows a typical installation with sensors and meters to capture the required data

(51) Int. Cl.
H02H 1/00 (2006.01)
H02H 7/20 (2006.01)

(56) References Cited

U.S. PATENT DOCUMENTS

| | | | |
|---|---|---|---|
| 2009/0195349 A1* | 8/2009 | Frader-Thompson | G01D 4/002 340/3.1 |
| 2011/0025519 A1* | 2/2011 | Donaldson | H04L 67/125 340/664 |
| 2011/0153246 A1* | 6/2011 | Donaldson | G01D 4/00 702/65 |
| 2012/0166115 A1* | 6/2012 | Apostolakis | G06Q 50/06 702/62 |
| 2013/0289788 A1* | 10/2013 | Gupta | G05B 13/02 700/291 |
| 2014/0207398 A1* | 7/2014 | Lai | G01D 4/00 702/61 |
| 2016/0079757 A1* | 3/2016 | Matan | H02J 3/06 307/24 |
| 2016/0132032 A1* | 5/2016 | Bruneel | H02J 13/00022 700/295 |
| 2016/0274556 A1* | 9/2016 | Murphy | G05B 19/048 |
| 2017/0090004 A1* | 3/2017 | Marshall | G01R 35/005 |
| 2018/0034657 A1* | 2/2018 | Brown | G06Q 10/0633 |

OTHER PUBLICATIONS

Jin, Yuanwei, et al. "A time-frequency approach for event detection in non-intrusive load monitoring." Signal Processing, Sensor Fusion, and Target Recognition XX. vol. 8050. International Society for Optics and Photonics, 2011. (Year: 2011).*

Wang, Huijuan, and Wenrong Yang. "An iterative load disaggregation approach based on appliance consumption pattern." Applied Sciences 8.4 (2018): 542. (Year: 2018).*

Bouhouras, Aggelos S., Apostolos N. Milioudis, and Dimitris P. Labridis. "Development of distinct load signatures for higher efficiency of NILM algorithms." Electric Power Systems Research 117 (2014): 163-171. (Year: 2014).*

* cited by examiner

FIG. 1 Typical consumption pattern for a cycling electrical device such as a refrigerator FIG. 2 Variance in electrical consumption based on common events FIG. 3 Creation of a model FIG. 4 Matching a model with a HIGH accuracy or match FIG. 5 Matching a model with a LOW accuracy or match FIG. 6 Matching a model with a LOW accuracy or match FIG. 7 shows a flow diagram of the logic used to determine the model FIG. 9 shows a typical installation with sensors and meters to capture the required data

MACHINE LEARNING APPLICATION TO PREDICTIVE ENERGY MANAGEMENT

FIELD OF THE INVENTION

The present invention relates to systems and methods using machine learning for monitoring, learning and adjusting the function of energy consuming devices. A model baseline may be established from monitoring power consumption data over a period to create a unique signature for the particular equipment, and changes to this signature are monitored to detect a deviation from an expected power consumption signature. The system thus allows for the automatic triggering of signals that alter or adjust device operation, the issuance of remote commands, or the triggering of service calls.

BACKGROUND OF THE INVENTION

Equipment that utilize electricity are designed with expected electrical usage parameters. For example, an engineer designing an air handler can calculate an expected energy usage for the piece of equipment based upon the size of the motor that is used and other criteria. This data is used by contractors to size the electrical wiring that is used to provide power to the equipment to ensure safe and proper operation.

In addition to having an expected instantaneous power consumption, equipment can have a characteristic power consumption pattern that corresponds or is based on the particular installation and configuration of the facility where the equipment is installed. When a piece of equipment operates, a characteristic power consumption can be identified by monitoring the electrical usage of the particular piece of equipment over time to establish a historical usage pattern. For example, a thermostat may function to turn on an HVAC system at a set point value. The power consumption of the HVAC equipment can be measured as a distinct spike in energy usage. After start up, the compressor and air handler may stay on for a duration until the temperature reaches the set point, and once reached, HVAC equipment is cycled off. A commensurate drop in energy consumption of the HVAC equipment can be measured. The HVAC equipment will remain off until the room heats or cools to a value at which time a heating or cooling cycle is triggered to start the HVAC equipment again.

Consistent patterns over time can be monitored and analyzed to determine if a system installed in a facility is operating within normal expected limits based on previously measured power consumption patterns. Monitoring can comprise measurement of: voltage, current and/or power factor. Monitoring can also consist of looking at external sensors and tracking commands and diagnostic data depending on the capabilities of the equipment or the installation.

It may be difficult, however, to establish a reliable power consumption pattern due to external variables that can significantly impact the consistency of expected patterns. These include, for example, changes to temperature, humidity and airflow, which can all significantly impact energy usage of installed equipment. Other variables, such as the number of room occupants, direct sunlight through windows or external openings can also impact expected energy usage patterns. It is contemplated however, the each of these variables could be monitored and measured and some reasonable range of variance could be factored into the established patterns.

It is further contemplated that as equipment ages, both the instantaneous energy usage for the equipment and the energy usage patterns for the equipment in the facility, could change. It could be possible to calculate these expected changes to adjust an expected usage pattern against which a piece of equipment is compared over the life span of the equipment. If the pattern or signature changes drastically or beyond a pre-set tolerance or threshold level, this could indicate a potential problem may exist. This identification may in turn, be used to trigger an automated action(s). For example, it is conceived that if an observed pattern degrades beyond a preset boundary, an alert may be generated and automated adjustments to the equipment may be affected. In other instances the alert may result in a closer look at the system, such as taking more frequent measurements or the correlation of other data or potentially related measurements, such as diagnostic information, or data from other sensors for example.

To further highlight the cyclic nature of energy consumption patterns for installed systems, consider as one example a deep freezer used in a restaurant environment. The freezer may be set for a set point of −20° F. When the internal temperature rises to −18° F., the compressor activates and starts to cool the freezer until the −20° F. set point is achieved after which the compressor shuts off. This cycle of cooling and warming creates a pattern that will repeat consistently with the duration of each interval being substantially identical within reasonable tolerances. These cycles can be seen and measured with the electrical power or current drawn by the compressor of the unit such that one would expect to see a spike in power consumption as the equipment turns on, and a settling into a normalized utilization level over a period of time the compressor remains on to cool the freezer by the required two degrees. Following this, it would be expected to see a drop in power utilization when the temperature set point is reached and the compressor cycles off. It would be expected that the equipment would remain off until the freezer gradually warmed up to the preset −18° F., at that point the cycle would repeat. Each of the cycles in the above example, which can also be seen in FIG. 1, exhibits a consistent pattern. It is contemplated that these patterns could be monitored and acted upon to trigger automated actions if there is a noticeable change or deviation from the expected pattern.

In any normal operating environment, additional variables come into play that will impact the cycle described above. These variables could include, opening the door of the freezer (the longer the duration and larger the impact), introduction of warm items into the freezer (the greater the number of items the larger the impact) and external temperature variances (the larger the variance the larger the impact). Other normal periodic operational functions could also impact these expected cycles such as defrost cycles and fan operation. While these factors may vary an expected pattern, they can be detected and factored into the monitoring system because, in most cases, these are only temporary deviations. For example, warm items eventually cool down, the air entering the freezer while the door is open eventually drops in temperature, and the room HVAC typically brings the room to a stable operating temperature. In contrast, variances caused by equipment faults or malfunctions that require intervention will persist as prolonged variances over multiple cycles.

While the figures and examples provided in this application often depict patterns as consisting of a single or a small number of cycles, systems can learn longer and more complex cycles. For example, if the defrost cycle comes on once a week, this can be represented as a longer multi-event cycle. Variances in this case could include seeing the defrost cycle come on more or less often. One reason to include these longer and/or more complex cycles in a pattern, which is used for comparison purposes, is to also diagnose the function these intermittent features provide. For example, if the device in question had a defrost cycle that was no longer activated, or activated more often, or even left on, an immediate diagnosis can be made and appropriate actions taken. This in turn will lead to quicker response to increased energy consumption, reduce the cycling or operation of the equipment that would lead to premature equipment failure and prevent the spoilage of perishables that may be contained in the space that is being serviced by the equipment.

Some examples of abnormal variances could be caused by a reduction in the level of coolant in the compressor, coils that have become dirty and therefore are no longer effective, blocked vents that limit airflow, and lose or leaking seals in a unit's doors. All of these problems may require some corrective action before the energy consumption will return to its prior normal or expected pattern.

In addition to the expected performance of equipment that is installed in a particular location at a particular facility, individual equipment regardless of installation is expected to function in a defined manner. While it is true that one motor of a particular size made by a manufacturer will have similar power consumption characteristics as a second motor of the same size made by the same manufacturer, in practice, each piece of equipment can have its own particular power consumption signature. Additionally, the variance from one piece of equipment from another "identical" piece of equipment due to manufacturing tolerances, can be mitigated by establishing a baseline when the particular equipment is first installed. This baseline could be used, for example, to measure the performance of a new compressor unit. If the new compressor unit does not meet an expected baseline within expected tolerances, the unit can be flagged as faulty and further investigation or possible replacement could be initiated.

In one example, a compressor may have a lifespan of a set number of operating hours. In a typical duty cycle, a gradual degradation of efficiency and performance would be observed as the unit ages. This expected degradation can be adjusted for in monitoring by adjusting an expected baseline of operation or tolerance level over time so as to avoid false alarms being triggered for maintenance events. Additionally, it is conceivable that the end of life of the unit could be predicted based on similar characteristics observed in similar units that have failed prior to the unit in question. For example, with a large install base of a given manufacturers units with an expected life span of a set number of operating hours, it could be predicted when a unit will fail based on an analysis of the measured energy consumption signature providing a basis for predictive analysis. This would be highly advantageous as failure of a unit could result in financial loss due to spoiling of inventory and even a potential closing of a business for repairs or replacement of the failed equipment. In some instances, replacement may require permits and outside service providers to perform the work at hand. Scheduling and performing such a replacement as a scheduled preventative maintenance activity would be preferable and cause less disruption and as such, an early warning indicator as described herein would be highly beneficial.

One may also decide to proactively replace a unit early in its life cycle due to new and emerging technologies. With the trend of rising electricity costs, as older units degrade and the new technology provides significant energy savings, an inflection point could be reached where the savings in energy consumption over time could cover the cost the new equipment or make an earlier replacement advantageous. The monitoring and measurement of the consumption patterns and expected consumption patterns could assist in determining the return on investment. The residual resale value of aging equipment could also be factored into this analysis.

Another problem associated with aging equipment is that of mechanical degradation or damage. Normal operation of the equipment causes degradation of seals and gaskets around the door of a unit. Without measuring the energy consumption, it may be very difficult to assess the impact of a leaking seal and how the compromised seal could be significantly increasing energy consumption.

Still further, in commercial and industrial environments, heavy equipment such as forklifts or trollies may be used in moving supplies in a facility. The operation of such equipment in the proximity of, for example cooling units, could result in damage to the cooling equipment or storage facility. For example, a door could be impacted and bent out of shape, a seal could begin to come loose, or a freezer could be impacted and dented thereby damaging internal insulation or overall integrity and seals. Monitoring could again detect any prolonged deviance from an established operation pattern of the equipment that emerges, which could show a degradation of the efficiency of the equipment.

Still another challenge is that commercial areas often comprise cramped spaces where supplies and packaging are sometimes stored in the same rooms as various equipment. Areas that require airflow may become obstructed such that the efficiency of the equipment suffers.

The result of these various different situations is that the equipment (e.g., the freezer unit) will not operate efficiently, and the electricity consumption will not adhere to the expected pattern. These changes in patterns should be detectable and intelligent data can be extracted from the observed deviation in patterns.

In addition to potential increased energy usage, in many scenarios described above there are important health and safety factors to consider. For example, refrigerated or frozen foods can spoil, blocked air vents could present a fire hazard and leaks could result in slippery surfaces or electrical hazards and in some cases even toxic fumes.

While many of the examples above had been made in connection with cooling equipment for a freezer, similar factors can be consider when applied to various different types of equipment including an HVAC system, a heater, a water heater of other appliances.

SUMMARY OF THE INVENTION

What is desired then is a system and method that can monitor energy utilization of specific equipment to compare that energy utilization to a baseline expected energy utilization.

It is also desired to provide a system and method that can create an expected energy utilization for a particular piece of equipment based on a measured energy usage signature of the equipment.

It is further desired to provide a system and method that will monitor energy utilization of specific equipment, which is compared to a baseline expected energy utilization that factors in multiple variables to make automated decisions on maintenance, control, and service of the equipment being monitored.

It is further desired to provide a system and method that will diagnose aberrations to the expected patterns and classify these into potential equipment problems as well as use historical accuracy of these predictions to improve its classification system over time.

It is still further desired to provide a system and method that provides for automatic monitoring and self-adjustment of the monitoring system such that the monitoring system runs more efficiently and processes the received data in a manner that limits or eliminates generation of any false alarms for non-typical but normal operation of the equipment.

In particular, the system and method provide for self-learning including software that monitors a variety of input data from equipment that is being measured and "learns" patterns of operation for the equipment. The system specifically increases the operating efficiency of the computer-based monitoring system by allowing for dynamic adjustments in the baseline operating parameters by considering dynamic inputs that would impact the operation of the equipment combined with expected operational data for the equipment taking into consideration the age, efficiency and life expectancy of the equipment. The result is a system that self-learns and self-adjusts resulting in much greater operating efficiency through the accurate detection of any anomalies and the reduction in false positive alarms for both the computer-based monitoring system and the equipment that is being monitored.

The present invention is directed to systems and methods for monitoring and characterizing energy consuming devices, e.g., via a network, such as a telecommunications network and/or the internet, e.g., using an electronic device such as a mobile phone, tablet, computer, and the like. The systems and methods herein may provide a baseline model for electrical consumption of devices and a detection method when expected usage characteristics do not adhere to conformity to the expected model. The automated issuance of remote-control commands, maintenance or diagnostic commands including the triggering of service calls for the replacement of equipment before failure or degradation is contemplated.

In some instances, the automated action may comprise taking additional and different types of diagnostics measurements including running the equipment through a diagnostic sequence to gather more comprehensive data. In other instances, the automated action may comprise adjusting the running of the equipment to a preset level while or until the detected deviation from the expected energy pattern can be resolved. Still further, the automated action could comprise running the equipment through a sequence of steps that are modified based on the gathering of more comprehensive data from a measurement device or a set of related and potentially separate of independent sensors.

Additionally, a secondary device may be provided that includes a controller, one or more sensors coupled to the controller configured to detect one or more in room parameters, e.g., occupancy, door openings, and the like and a wireless communication interface. The device may also communicate through low power wireless signals, such as Wi-Fi or the like, to a remote computer system, which may store data from the sensor(s), analyze the data, generate an action, and/or generate reports and alerts based at least in part on the data.

In such an embodiment, a device is provided that includes a controller, one or more sensors coupled to the controller configured to detect the power consumption of one or more devices that are being monitored where each includes a wireless communication interface. Power consumption could comprise a power measurement or a current measurement via one or more current sensing devices (e.g., current transformers or the like). These devices may communicate through low power wireless signals, such as Wi-Fi or comparable, to a remote computer system, which may store data from the sensor(s), analyze the data, adjust the operation of the equipment, and/or generate reports and alerts based at least in part on the data. This data may be used in conjunction with the other sensor data providing a framework within which a baseline for the equipment is set and monitoring the performance of the equipment at any given time.

In an exemplary embodiment, these sensors are placed in a facility to capture temperature, humidity and room occupancy along with the power consumption of equipment. A single sensor for temperature and occupancy may be used depending on whether it is desired to measure temperature and occupancy in multiple places in a facility. The sensor measuring power consumption captures data at intervals sufficient to map a baseline. This would include turning the equipment on, measuring the equipment while it is running, and cycling the equipment off. It is contemplated that multiple cycles should be measured. In one configuration, non-sequential cycles may be measured taken at different times of the day. In terms of data granularity, it is contemplated that measurements should be in minutes or seconds. These measurements may comprise a current measurement, a voltage measurement or a combination of the two with time stamps for correlation for instantaneous power draw calculation.

Taking an example device, such as a compressor used in refrigeration or HVAC to illustrate, readings may be taken over time to establish patterns or a signature and then extrapolate a baseline of expected usage. In an exemplary embodiment, these measurements are made on factory equipment to establish an expected usage profile for the equipment when new. When equipment is installed, this baseline is used to establish and measure variances from the factory installed equipment that is expected to function within a set of tolerances. If the baseline is not consistent with a factory-generated expected baseline for the equipment in question, then remedial action may be taken immediately to verify the installation, the equipment itself, or the monitoring equipment. The remedial action could include altering the function of the equipment and running a diagnostic to gather more comprehensive data. As adjustments are made, or if the baseline of the installed device is within the expected tolerance, power consumption is then measured over time and reported to a remote computer for storage and processing.

As the equipment runs according to its designed and set parameters, additional data derived from the additional sensors described above (door open, humidity, temperature etc.) may be combined with the power usage data to create a dynamic baseline for which power consumption can be fully analyzed to generate alerts, or take corrective action if needed. To illustrate, if a typical baseline measurement includes a cycle of approximately 10 minutes to cool a freezer by 3 degrees to its step point value and the tolerances for reaching this goal is set to +2 minutes, then any variance of more than 12 minutes could be flagged as a trigger for action. However, this may comprise a "normal" cycle in which the freezer slowly warms when no peripheral action is taken (e.g., the door has not been opened since the last cycle). Should a complementary sensor, such as a door open event be detected within a few minutes of the cycle, the tolerance could be adjusted. Likewise, the adjustment could correspond to the length of time the door was identified as open. Additionally, or alternatively, the system could disregard the next cooling cycle entirely as opening the door may involve the addition of food items which will take an even longer duration to cool. Such flexibility in programming illustrates how thresholds can be dynamically adjusted thereby allowing the system to avoid false positives.

In still another embodiment, the systems and methods may provide early warning indicators by confirming if the equipment maintains temperatures within a normal thermal efficiency range while all heating and cooling systems remain functional. For example, if a properly sized unit is no longer able to keep up with what should be a normal temperature differential at times of peak temperature variations with the outside environment. In such a case, the system may report when thresholds are not met in the form of alarms or warnings, allowing for further analysis by supplying the captured test results and data for review. It may be that changes to the space have resulted in the system being undersized or improperly adjusted.

In still another configuration, an adjustment for the expected baseline may allow for a gradual degradation of the equipment over time. For example, a device half way through an expected lifecycle may exhibit some degradation in efficiency. This slope of degradation may become steeper during the remaining lifetime of the equipment. This deterioration can be compensated for by applying known deterioration values based on the age of the equipment, which will reduce false positives. It should be noted that even while the allowable values may allow for, as an example 20% degradation after a set number of operational hours of service on a piece of equipment, these values may not be used on their own as the degradation may also be measured from prior readings including a measured rate of degradation for the specific equipment. A sudden degradation, even if values remain in the acceptable range may still however, be flagged as an anomaly by the system.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

Once a piece of equipment is put into service, and the expected baseline has been established, a monitoring exercise that accounts for the duty cycle and operational elements in the environment is created. For example, for a freezer at a fast food restaurant, the number of times the door is opened, the external temperature at the store, the hours of operation and occupancy which may affect both above items are measured and becomes part of the calculation. These patterns both establish the baseline for the equipment itself as well as the operations of the business using the equipment.

The system is programmed to predict the outcomes and measurements such that variations outside of expected tolerances will generate alerts and potentially cause automated actions to be taken. However, it is contemplated that looking at longer term patterns will function to eliminate false positive alerts. This hysteresis of values can be adjusted depending on the severity of the situation and the potential impact of the anomaly.

For example, if the door is left open while loading the freezer, this could be accounted for by allowing for a value (say ½ hour) to compensate. It would be expected that the freezer would return to a normal pattern of operation once the door is closed and the newly introduced food or items have cooled down. However, if the door has remained open long enough that the freezer temperature and inside food temperatures rise to a point that the food may be spoiled, there is an urgent need to trigger alerts and actions. In another example, there may be temperature sensitive medication or other matters that have a tight allowable temperature range that may require the establishment of tighter bounds or early and more urgent warnings or indicators.

Actions taken upon the reaching of established thresholds may not be simply binary. For example, an escalating level of urgency could be provided where the initial alert may be an audible alarm on the door which goes off reminding someone in close proximity to the freezer to close the door. Failing this, additional escalation such as a contact sent to the front of the store, or a text message sent to a local manager or duty staff. Escalation may go as far as dispatching the owner or a technician to the site or in some cases even remote-control action. In some cases, this may involve starting remote diagnostics, triggering a reset of a piece of equipment or simply having someone look over a webcam at the piece of equipment for obvious signs of blockage. Even if the freezer cannot be repaired with a proper closing of the door, a dispatch would allow for mitigating action with respect to in the contents of the freezer.

Another example is a hot water heater. The normal cycle for hot water measured at the factory is similar to a freezer in that water enters the tank and is heated to a preset setting so that it is ready to use. Once the tank temperature is set, the heater element turns off. The hot water remains in the insulated tank but gradually cools to another preset value that causes the heater to come back on again to reheat it to the pre-set and desired value. In such a case, a pattern of power consumption is measured as coming on with a spike to start the heater, staying on long enough to heat the water to the desired temperature, and then going off for a period of time that the water cools to the set point that triggers the reheating of the water. Once in service, the hot water tank will lose hot water as it is consumed while cold water is added to the tank to refill it. This in turn functions to lower the temperature of the water in the tank and starts the heating cycle again. The patterns of when hot water is used may follow a routine of washing dishes or cleaning up at certain periods of the day, which may be accounted for in usage patterns.

One further example is one of an advanced refrigeration control that does defrost cycle management. Such a unit is used to optimize defrost cycle timing, typically by reducing these based on data obtained from sensors, such as frost detection. Occasionally, even such power saving equipment that works well to save power under normal circumstances, may contribute to excessive consumption. For example, if a fan has ceased functioning and the defrost cycle starts, assuming the fan is frozen in ice, it's conceivable that the defrost cycle, a cycle that takes a lot of energy, may come on more often or even stay on repeatedly causing both an increase in energy use as well as potentially other issues with the equipment. In these situations, having sensors on multiple pieces of equipment including the fan, and a temperature sensor inside the unit, would allow the system to override the defrost system until the malfunction could be addressed.

There are numerous examples where this could be implemented including refrigeration, hot water generation, freezers, ice makers, HVAC equipment, ovens and toasters and so on. Sensors relating to temperature and humidity could provide further information for the system to analyze as well as air flow sensors and the like.

It is still further understood that certain equipment may have heavier usage at certain times of the day. For example, the business could be baking bread and the ovens could be drawing a relatively large amount of power at certain times of the day. However, at other times the usage may be much lighter. It is conceived that the system can learn the usage over time and generate usage patterns based on the business patterns.

While understanding the pattern deviations and establishing root cause with some probability is an important aspect of the invention, another aspect is the ability to automatically correlate the various sensors to better predict and then take automated actions. The establishment of this root cause table and confidence level and the ability of the system to learn and adjust/expand this table are key elements. As the predictions are proven true, confidence in the determination algorithms increases while when proven wrong, adjustments are made and algorithms adjusted.

In one configuration, a system for automatically learning and adapting to the energy usage of an equipment operating according to a control input, the system comprising: a computer having a storage and coupled to a network, a sensor coupled to the network and associated with the equipment, and software executing on the computer including an expected energy usage over time signature the equipment is expected to follow during operation for a time period. The system is provided such that the sensor measures the energy used by the equipment during operation for a measured period of time, the sensor generating energy data based on a measured energy usage for the measured period of time and transmitting the energy data to the computer. The system is further provided such that the software generates an actual energy usage over time signature based on the received energy data for the measured period of time, and deviation data is saved on the storage and includes a threshold deviation from the expected energy usage over time signature. Finally, the system is provided such that the software compares the actual energy usage over time signature to the expected energy usage over time signature, and wherein when the actual power usage signature exceeds the threshold deviation, the software initiates an action selected from the group consisting of: running the equipment through a diagnostic routine, setting the equipment to a preset level of operation, setting the equipment to a preset duration of operation, turning the equipment off, cycling the equipment, generating an alarm and combinations thereof.

In another configuration, a system for automatically learning and adapting to the energy usage of an equipment operating according to a control input is provided comprising: a computer having a storage and coupled to a network, a sensor coupled to the network and associated with the equipment where the sensor measures the energy used by the equipment during operation for a first time period, the sensor generating first time period energy data based on the measured energy usage during the first time period and transmitting the first time period energy data to the computer. The system also includes software executing on the computer generating an energy usage over time baseline based on the received first time period energy data, deviation data saved on the storage comprising a threshold deviation from the energy usage over time baseline where the sensor measures the energy used by the equipment during operation for a second time period, the sensor generating second time period energy data based on the measured energy usage during the second time period and transmitting the second time period energy data to the computer. The system is provided such that the software modifies the energy usage over time baseline based on the received second time period energy data to generate a modified energy usage over time baseline, the software modifies the deviation data based on the received second time period energy data to generate a modified deviation data, and the software generates an expected energy usage over time signature based on the modified energy usage over time baseline and a threshold deviation signature based on the modified deviation data.

Other aspects and features of the present invention will become apparent from consideration of the following description taken in conjunction with the accompanying drawings.

BRIEF DESCRIPTION OF THE DRAWINGS

The drawings illustrate exemplary embodiments of the inventions, in which.

DETAILED DESCRIPTION OF THE INVENTION

Figure 1:
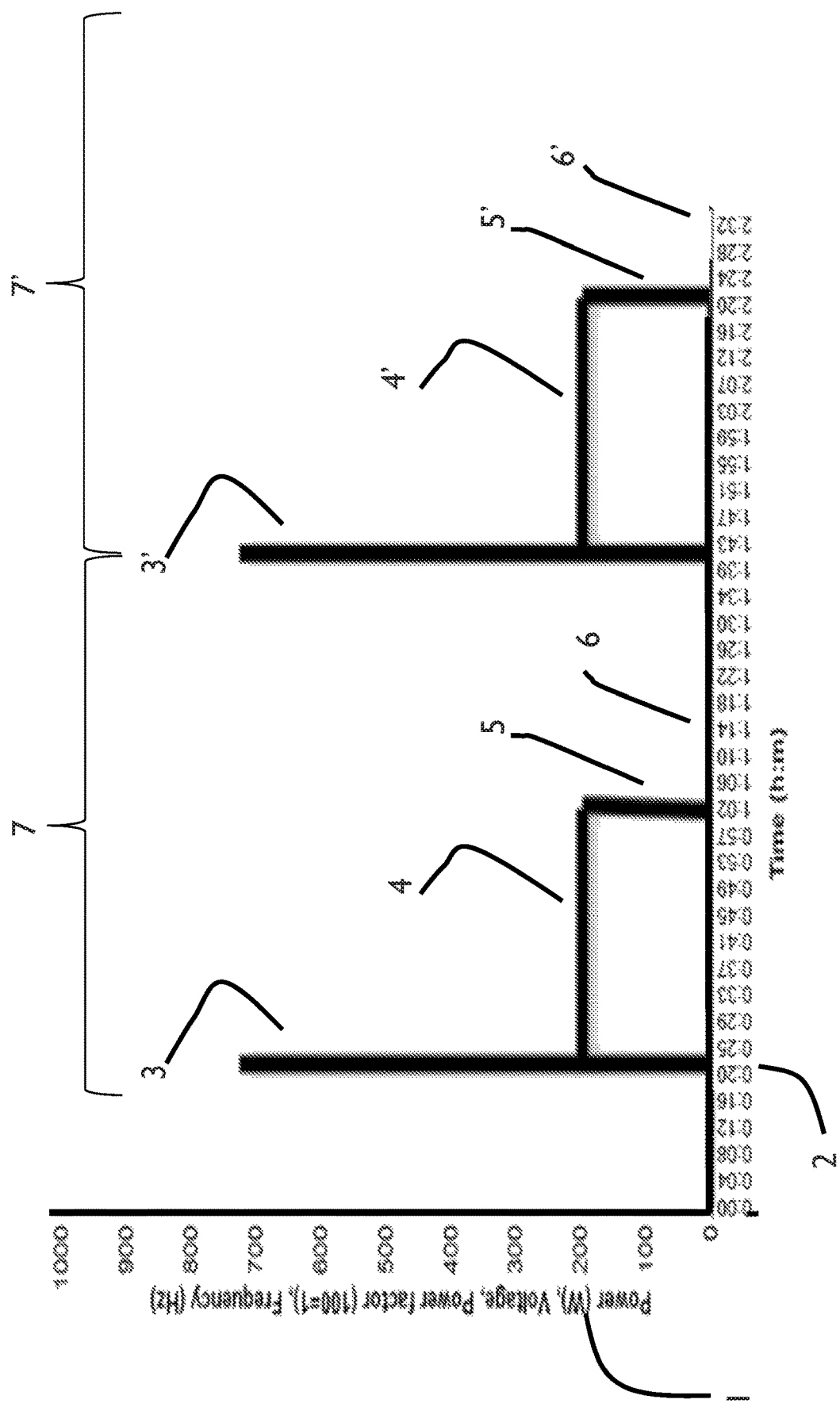
FIG. 1 is a drawing showing a typical consumption pattern for a cycling electrical device such as a refrigerator.

The reference numbers in specific figures refer to elements in those figures. Turning to the drawings, FIG. 1 shows a typical pattern of electrical power consumption of a refrigerator cycling its compressor to keep its contents cool. The chart shows the power used (1) on the Y-axis, and elapsed time (2) on the x-axis.

On the depicted graph starting on the x-axis time (2) we can see that there is little to no power consumption until a relatively large spike (3) of usage as the compressor cycles on. This peak is the compressor coming on, and then quickly settling into a steady state consumption (4) level that remains active for a number of minutes. While the consumption (4) may have some variability, it is expected to be fairly consistent while the compressor is running. After the cycle of cooling, and when the refrigerator reaches a programmed set point, consumption (5) drops as the compressor cycles off resulting in a drop in power usage. This state with little to no usage (6) continues until the refrigerator warms up to a point where the compressor cycles back on repeating the pattern (3',4',5',6'). As can be seen in FIG. 1, this repeated pattern or cycle (7,7') essentially repeats as the equipment associated with the refrigerator cycles on and off to maintain a set point.

Figure 2:
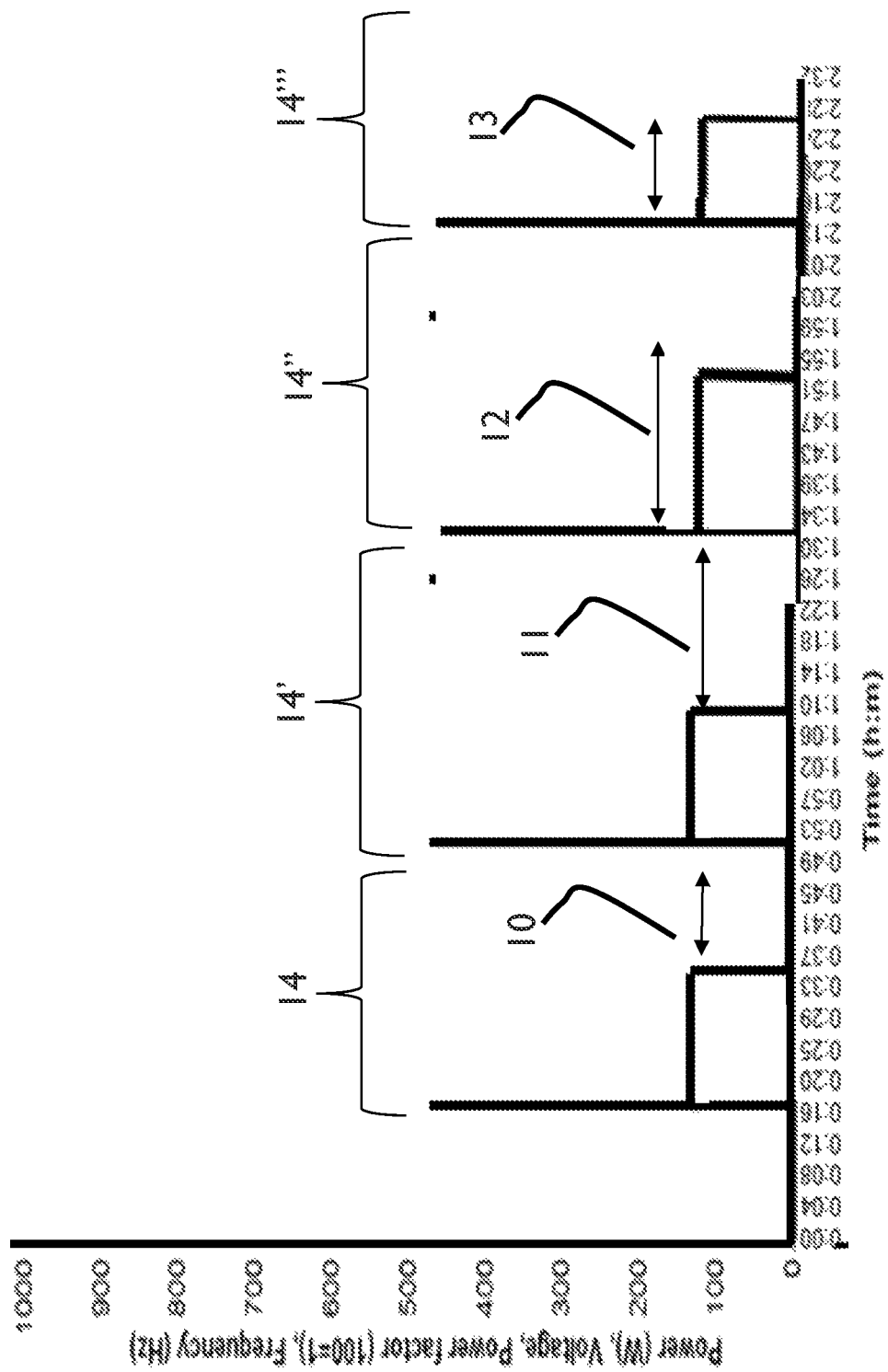
FIG. 2 shows variance patterns on the usage of a typical fridge based on external factors.

Turning now to FIG. 2, similar patterns from FIG. 1 are shown but extend to show 4 cycles (14,14',14",14''') obtained by monitoring and capturing data points of the cycling of a refrigerator. When comparing the cycles (14, 14',14",14''') certain differences can be detected within the cycle in terms of the duration of the various identified aspects of the cycle. For example, the time between turning off the equipment and starting it again shown in (10) and (11) may vary where the second cycle (11) is noticeably longer. In such a case, when the equipment being monitored is a refrigerator, it indicates that the ideal temperature achieved when the refrigerator cooled to its desired set point was retained longer in (11) than it was in (10). In other words, the refrigerator warmed up faster in cycle (14) than it did in cycle (14'). This may be due to a number of reasons including, for instance, because a door was opened, warm food was placed in the fridge or some other event affected only this one cycle of cooling. Once the internal temperature of the refrigerator was again cooled to the set point, the duration of the cooling cycle again corresponded to the expected duration in (11). This variance due to a common event is to be expected and would not warrant the creation of an alarm. It can further be understood that peripheral sensors, such as a door sensor that will detect if a door has been opened, can provide additional input to the system. The threshold deviation signature that the system matches the measured power usage against can be adjusted based on whether the door is detected as open and for how long. Likewise, a temperature sensor in the refrigerator can provide temperature data to the system that can also be used to adjust the threshold deviation signature based on the actual measured temperature in the refrigerator.

Again, in FIG. 2, when looking at the duration that the refrigerator stays on, it can be seen in (12) that the power to the compressor is maintained longer that it is in (13). Again, this suggests that it takes longer to cool the refrigerator to the set point, and the compressor stays on for a longer period. Since this pattern only affects one cycle, this deviation from "normal" operation can be classified as a transient event such as an open door or the placement of warm food in the refrigerator causing a single cycle to work harder. Once the desired temperature is achieved and presumably the contents of the refrigerator are cooled to the desired temperature, the normal duration of the cycles resumes.

Figure 3:
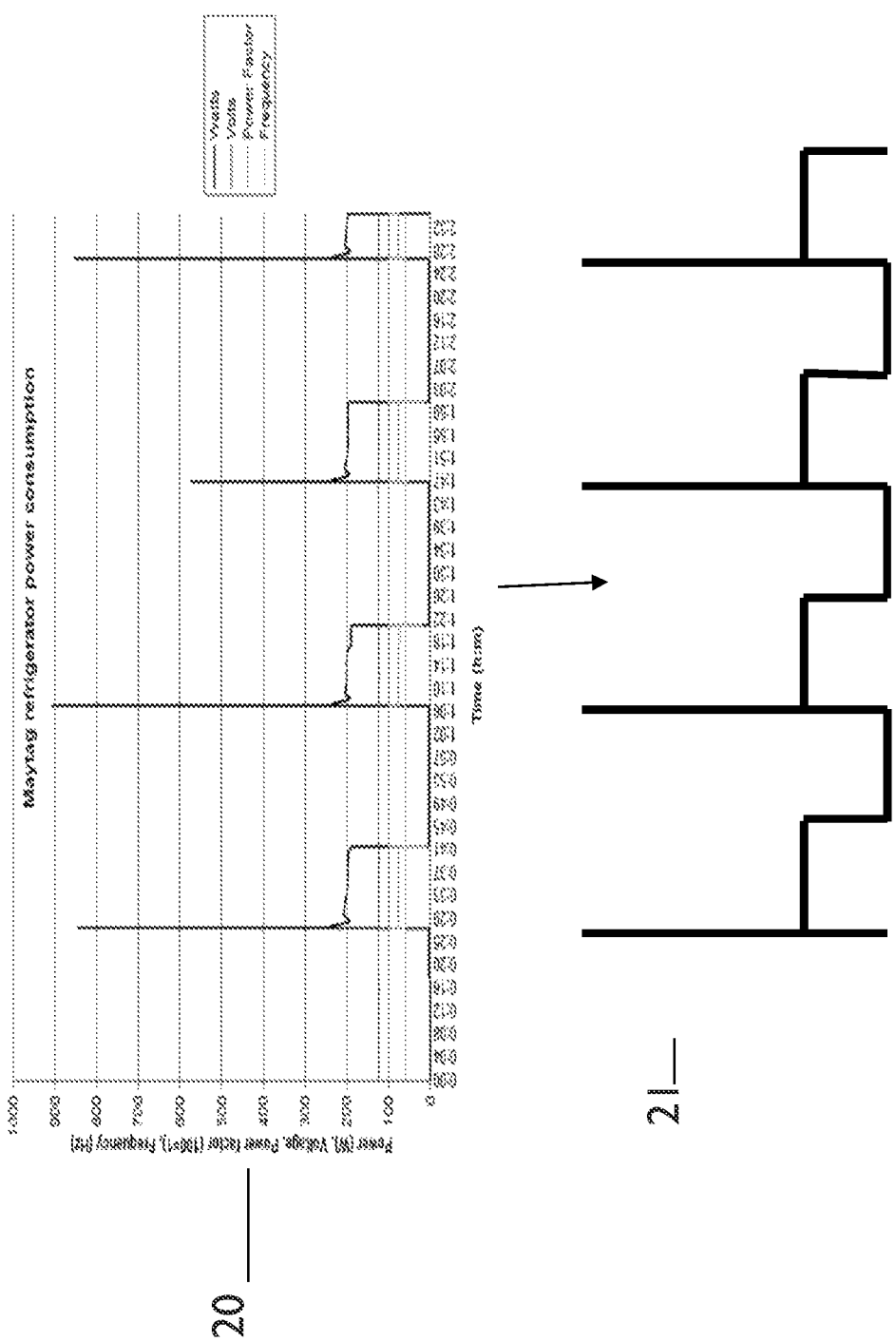
FIG. 3 shows the creation of a model based on the consumption patterns of a given device.

Turning now to FIG. 3, a measured pattern (20) for a given refrigerator at a given location at a given point in time in its duty cycle is illustrated. From the readings in (20) a model (21) can be generated that comprises an expected consumption pattern for this particular refrigerator equipment. For the depiction, only four cycles are captured, but this model can range from a single cycle to many cycles spanning a longer period of time. Likewise, various cycles can be monitored and measured at different times of the day in a non-sequential manner. The system seeks to identify repeating and consistent patterns to build the expected energy consumption signature for the particular equipment.

Figure 4:
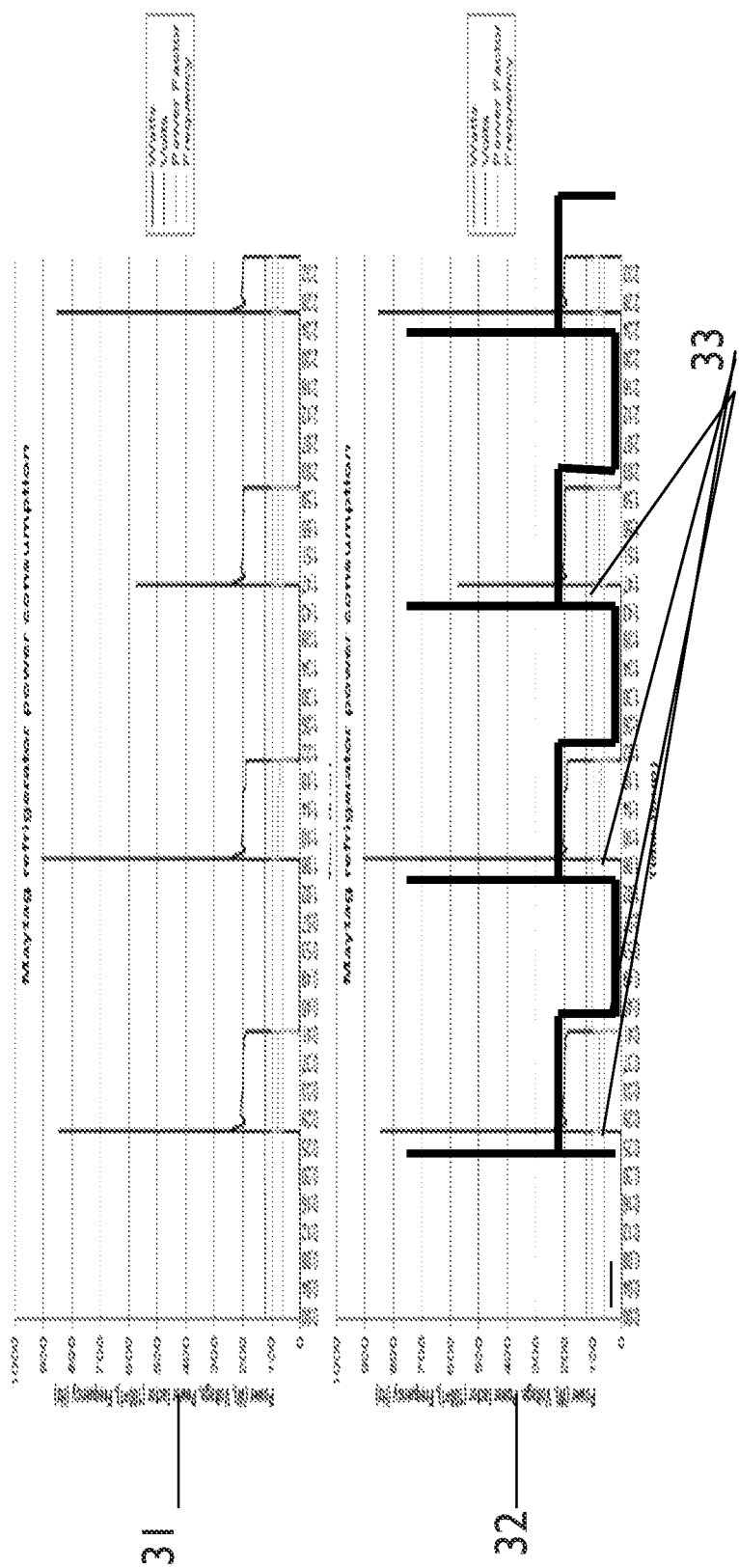
FIG. 4 shows a depiction of a matching pattern with HIGH accuracy suggesting equipment functioning normally.

In FIG. 4 the same model is shown that was generated in FIG. 3, but now with an actual power usage measurement of a refrigerator (31) superimposed thereon. As can be seen there is some slight variance from the model to the curve shown in (33). This illustrates that while the match is not identical, it is fairly close and can be tolerated within set threshold.

Figure 5:
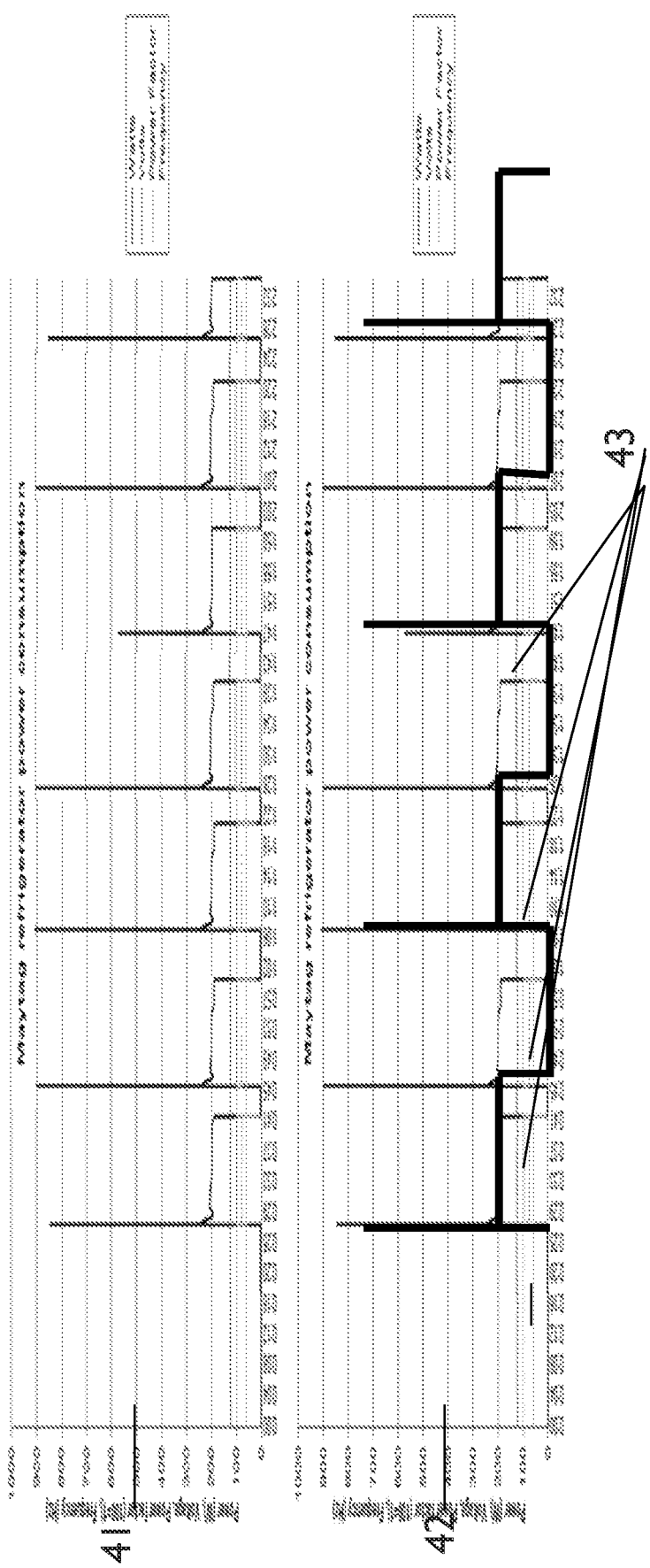
FIG. 5 is a depictions of a LOW accuracy match suggesting equipment problems.
Figure 6:
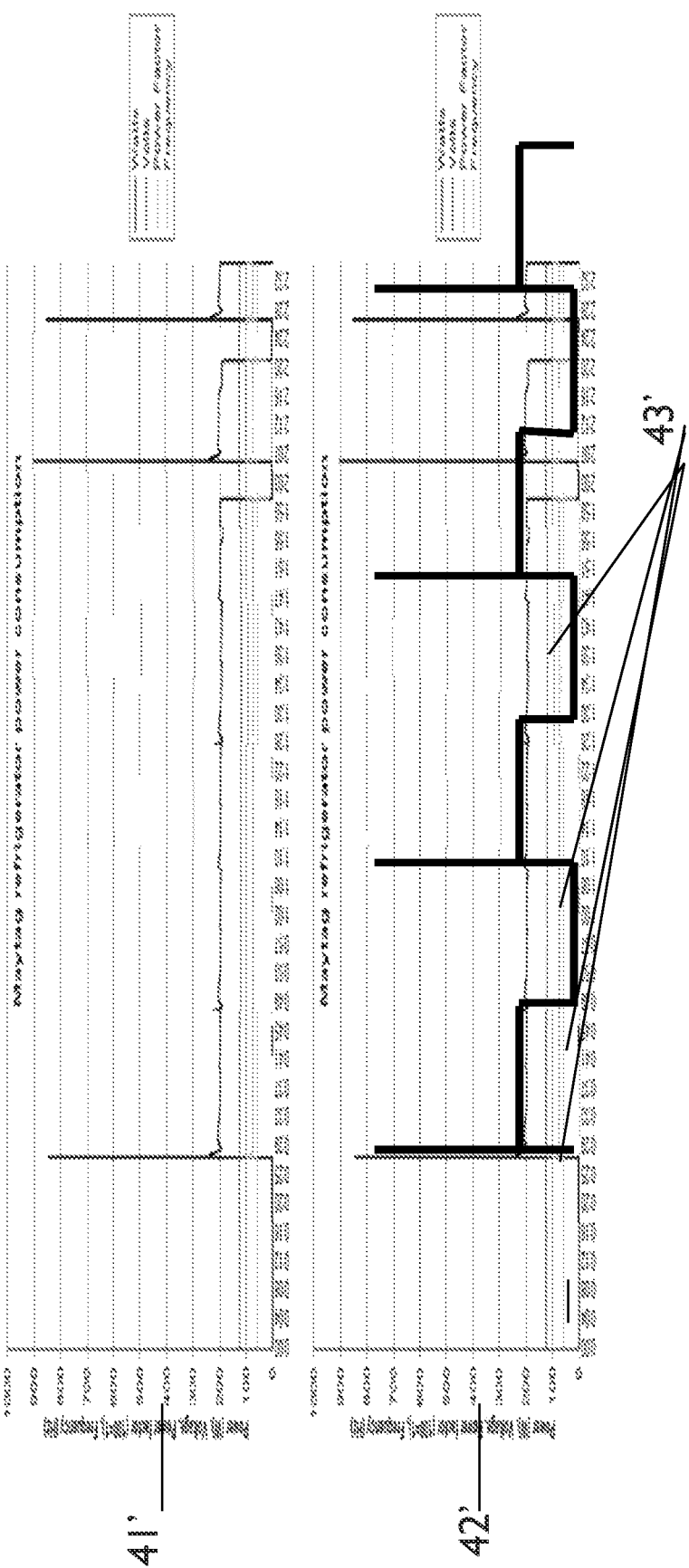
FIG. 6 is another depiction of a LOW accuracy match suggesting equipment problems.

In FIG. 5 the pattern in (42) is again matched up with another power consumption measurement (41). However, this this instance, it can be seen that the matching is highly inaccurate. FIG. 6 illustrates a similar pattern.

The curves shown in FIG. 5 and FIG. 6 depict standard types of deviations from a "normal" power signature that indicates something with the equipment is wrong and needs to be analyzed. In the case of FIG. 5, the cycles are all shorter than normal and this pattern is consistently repeated over a long duration. For refrigeration equipment, this type of pattern suggests that there is either a leak (failed seal or possible damage) or an opening in the refrigerator (door not closing properly) as the temperature set point is not being maintained for the proper duration based on historical readings when the equipment was known to be functioning properly. It could also suggest an issue with a sensor or a mechanical or electrical problem. Regardless, this over-frequent cycling of the compressor adds significant cost due to increased power consumption and the increased usage of the equipment will result in the equipment reaching end-of-life much sooner than expected due to the increased usage.

FIG. 6 also shows a pattern whereby the compressor stays on for an extended period of time due to not being able to achieve the set point temperature within the expected time frame based on the expected power usage signature or pattern. This particular signature when analyzed in connection with refrigeration equipment, may suggest there is a problem with ability of the equipment to efficiently cool the space caused by a low coolant level, or a potential problem with the compressor. Regardless, this cycling of the compressor will significantly increase the power usage of the equipment.

While FIGS. 5 and 6 show examples of abnormal cycling of a compressor, these are not meant to be limiting as one of skill in the art can conceive of numerous other variants of how actual power usage deviates from an expected power usage pattern or signature.

Figure 7:
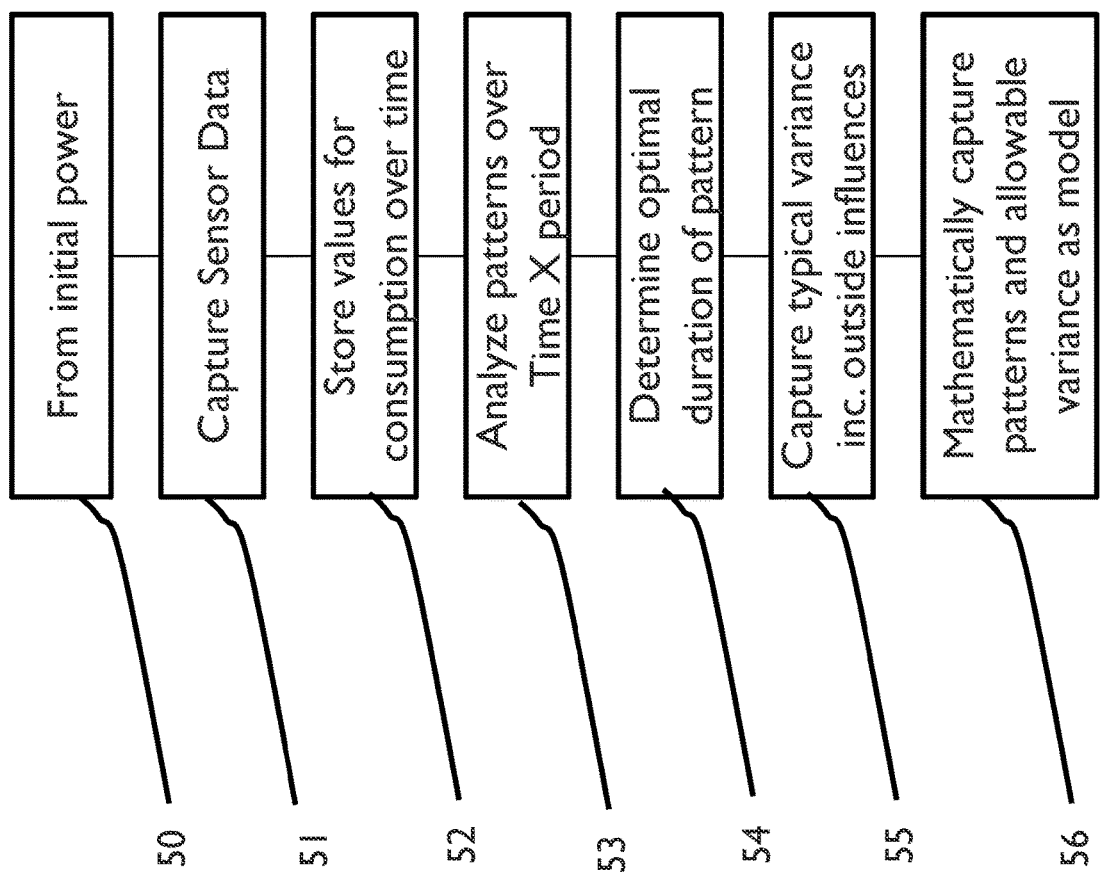
FIG. 7 shows a flow diagram of the logic used to determine the model.

Turning now to FIG. 7 a flow diagram is depicted for capturing and establishing a model from actual measurements. When the system is powered up (50) power consumption data is captured via sensors or meters on the equipment (51). This data is stored over time (52) to establish and create plots as shown in the preceding FIG. 53).

Once it is determined that a sufficient number of measurements are obtained, a pattern is established (53) and the system determines an optimal duration for this pattern (54). Further, a typical variance (55) is measured within pattern cycles to allow for the limiting or complete elimination of false positives. It should be noted that this pattern could also account for the effect of external variances. For example, a sensor for room occupancy for an HVAC system may offset the expected usage and add an additional amount of acceptable time for a cycle to complete, the knowledge that the delta between the inside temperature and the outside temperature is relatively large can also be accounted for as the expected utilization of HVAC equipment would be larger (e.g., more use in hotter summer months). In the case of a refrigerator, the room temperature could be considered. Many such influences can be measured and accounted for in the model depending on the equipment being monitored. This expected power usage pattern or signature and the allowable variance therefrom is captured mathematically (56) and is used to generate alerts and alarms. It will be understood by those of skill in the art that a variance or deviation from the expected energy or power usage pattern or signature can trigger an alarm or action when the usage is either above an expected range or below an expected range.

Figure 8:
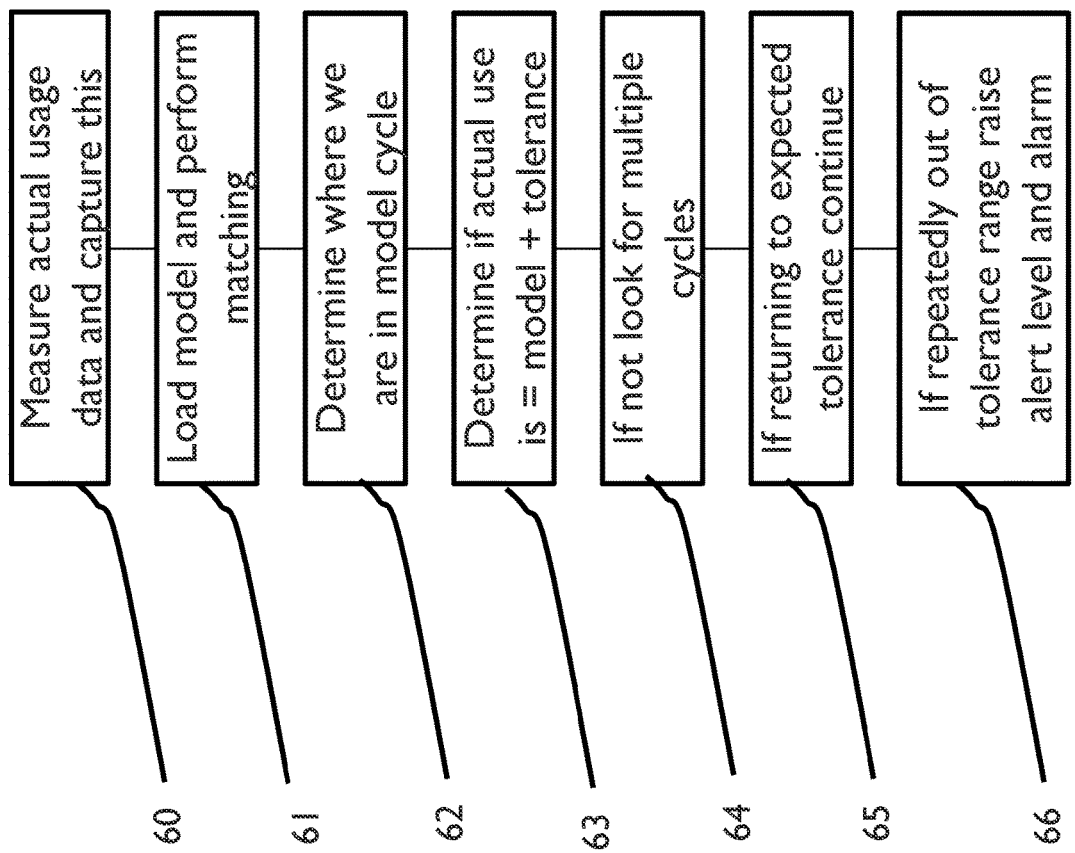
FIG. 8 shows a flow diagram of the logic used to compare a model with actual readings leading to automated actions and triggers.

Turning now to FIG. 8 a typical cycle of measuring and comparing the expected power usage signature to actual measurements is shown. The measurement data is obtained from the monitored equipment (60) and the given expected power usage pattern for the known equipment is loaded (61). Next it can be determined where in the model the current measurements currently are (62). The system then tracks the actual usage and compares it to the expected model determining whether this is within the expected range of the model and any allowable tolerance (63).

If there is a variance in the pattern outside of the expected tolerance, the system looks to see if this is repeated over multiple cycles (64). In other words, the system includes software that comprises a filter such that an alert or an alarm with not be generated until deviation from a threshold occurs for a minimum number of equipment cycles. It is contemplated that this filter would require at least two complete equipment cycles prior to initiating an alert or an alarm, but one of skill in the art will understand that more than two cycles may be required. Additionally, in another configuration, the number of cycles may be programmable. Still further, the threshold deviation in terms of magnitude of deviation and frequency of deviation may be programmable. If after one cycle the measured power usage pattern resumes a "normal" pattern (65) (e.g., within the tolerance level) no further action is taken; but if the patterns consistently vary from the expected pattern beyond the tolerance level, then an alert is set for action to be taken (66). This action may include remote control of the equipment or a service call placed to initiate service to the equipment or both.

While the system establishes a baseline curve for equipment being monitored, adjustments are necessary to compensate for a variety of circumstances. As shown in the figures, the system does not employ a fixed curve from which any variance would cause an alert. Rather, a built-in hysteresis or range of values sets up a threshold for any alerts. Further, criteria regarding the capturing of multiple successive cycles exhibiting values outside of these ranges are used to trigger alerts.

As a real-world example, consider a compressor associated with a deep freezer at a QSR (Quick Serve Restaurant), which has been baselined to cycle On for 10 minutes and Off for 30 minutes. In this situation, imagine the internal freezer temperature having a setpoint of 0 degrees Fahrenheit (0° F.). When the temperature rises above 2° F., the thermostat triggers the compressor which cools the freezer to −1° F. This cooling cycle takes 10 minutes in the example being illustrated. Once cooled, the temperature gradually rises as warmer air leaks in from the surrounding area causing the temperature to rise to 2° F. This warming cycle takes 30 minutes in the example being illustrated. This example will be used throughout this section to highlight how the system incorporates variations and compensations.

In this example, the quantity of food and the room temperature will have some effect on the cycling times. To compensate, a variable of 20% is added to each of the cycling times allowing for a compressor On-cycle of 8-12 minutes and a compressor Off-cycle of 24-36 minutes. These threshold values are established through the monitoring of a large number of similar or identical freezer units in operation at similar establishments and have shown to be accurate cycling times for the majority of business scenarios where doors are opened periodically and food items are put in and taken out of the unit. Manufacturing and assembly tolerances may also affect how a particular unit may perform. Regardless, over any considerable period, the cycle time will remain within this range of expected values and no alerts will be generated.

In the QSR example above, supplies are stocked into the freezer three times a week causing the door to remain open for an extended period. This door opening, however, only impacts a single cycle in that the warm air entering the unit while the door is open triggers the cooling cycle of the compressor sooner than the 30 minutes and the compressor remains operational for longer than 10 minutes as the temperature rises higher than 2° F. To Illustrate again, consider that the door is open and warm food is being introduced into the unit. The temperature reading quickly rises above the 2° F. threshold triggering the compressor to turn on. This event had triggered the cooling cycle before the expected 30 minute+/−20% threshold starting what will be a monitoring of a possible deviation by the system. If the cooling cycle had just completed, the system was only 5 minutes into the normally 30-minute warm up period when the temperature threshold was crossed.

Continuing in the illustration, the staff prop the door open and start placing more warm food into the freezer. Even as the cooling cycle has started, with the combination of the open door and the relatively warm food being placed into the freezer, the compressor is prohibited from being able to cool the freezer and the temperature continues to rise. The typical 10-minute cooling cycle is extended, and another threshold is crossed as the system is monitoring a possible deviation. When the door is finally closed, we can suppose that the temperature inside the unit is now approximately 6 degrees. Due to the relatively high temperature in the freezer, it takes the compressor a full 30 minutes to cool the interior to the desired −2 degrees. This deviation in the cycle time has been captured, which exceeds the thresholds in that there was a 5-minute warm-up cycle (rather than expected 30 minutes), and there was a 30-minute cool down cycle (rather than expected 10 minutes). This is clearly a variation outside of the expected or tolerable range (long term), however, it is also a normal and expected occurrence that will happen from time to time during normal operation of the business.

Other examples which may affect these cycles intermittently are the use of advanced refrigeration controls that could prohibit the running of the compressor during a defrost cycle(s) to reduce peak demand. Additionally, holistic peak demand management systems driven by an intelligent facilities controller may also extend compressor cycles or adjust setpoints when in peak demand scenarios.

To allow for these "normal" deviations, the system may be set with a filter, such that 3 consecutive cycles must exceed the outer bound of the expected cycles before triggering an alert. In the previous example, while one cycle included a short 5-minute warm up cycle and a longer than expected 30-minute cool down cycle, once the interior of the freezer is cooled sufficiently the freezer will revert to its typical cycle timing. In such cases, the aberration for a single cycle or two consecutive cycles will be ignored and no alert will be generated. It is contemplated that the filter could be set such that only a certain number of total deviations may be allowed during a 24-hour period. For example, if the system deviated for two cycles and reverted to "normal" operation, but then deviated for two additional cycles and reverted to normal operation, this would not cause an alarm even if repeated indefinitely. The system could have a set number of total cycle deviations allowed during a time period (e.g., max 8 deviations in 24-hour period) beyond, which an alert or alarm will occur.

In some installations, additional sensors may also be placed which are monitored by the system. For example, a door open alert can nullify the current cycle as it is known that there is activity underway that will clearly affect the cooling cycle in progress. These sensors are further utilized to generate alerts or alarms if doors are left ajar or opened beyond preestablished time thresholds.

As another variation in the system, aging equipment is known to degrade in efficiency over time. In such cases, energy usage curves have been modeled and are applied to the expected threshold values over time. For example, even with proper maintenance, the efficiency of a compressor will drop as will the efficiency of door seals on the freezer. Leaky seals will be seen when the warm-up period is shortened (e.g., instead of 30 minutes, it is reduced to 26 minutes). Likewise, a less efficient compressor will take more time to cool the interior of the freezer leading to a lengthened cool down cycle. The curves are not linear and this age-related compensation may, in one configuration, be accomplished by adding a skew to the values of the expected range. The system focuses on the 'lower bound' of the warming cycle and the upper bound of the cooling cycle as these would typically be the more problematic areas. If a known compressor model has been benchmarked or tested and is expected to degrade by approximately 10% over 5 years in operation, the variation in the monitoring system may be set to increase by 10%. Applied to the above QSR example, the freezer will now set it's bounds to a 10-minute cool down cycle −20% but +30%. The cool down cycle will be set to 30 minutes+20% but −30%. Other aspects of the monitoring could remain the same or adjusted as desired. For example, it is contemplated that the system settings could be programmable.

The system could also be configured to disregard these age-related deterioration compensations and generate alerts when the systems exceeds the thresholds. It will be understood that some operations may decide that they want to upgrade their equipment more frequently and will want to know when the equipment degrades to the threshold. Desiring to replace equipment at an earlier stage could be due to the fact that materials and equipment are increasingly and rapidly becoming significantly more efficient. Thus, the realized energy savings of early swap out of equipment may be justified. Still others may prefer to get these alerts and then put proactive maintenance in place, but it is expected that such maintenance would rather keep the units from falling below the thresholds established by the system. These settings are configurable/programmable to allow for a multitude of indications. While false positive alerts are not overly problematic, they can be expensive if they trigger unwarranted service calls or cause automatic modification in the operation of the equipment.

Business-related factors may also affect the cycle times being contemplated. For example, a QSR doing twice as much business may open the freezer door twice as often. Door opening alarm systems and the multi-cycle requirement for alerts can be used to adjust for these variances when it comes to freezers, but other QSR equipment such as ice makers, bread ovens, and HVAC may all have to work additional cycles to service more patrons.

Other factors such as compressor placement may also affect efficiency and introduce seasonality variances with temperature. Such factors are compensated for in a similar way as the aging of equipment. For example, outside temperature can be factored in to compensate for compressor having to work harder in warmer seasons. For example, a larger offset can be used to factor in a compensation variable allowing for longer cooling times during these times.

While the example used to illustrate the compensation was a freezer compressor, many other types of systems, such as a HVAC system, would have direct impacts from temperature variations that are built into the compensation model directly. For example, the temperature variation of outside temperature versus a desired inside temperature will have a direct bearing on the expected cycle times and must be accounted for. The system could use these dynamically changing temperature differentials to determine the cycle times, while the deviation thresholds could remain consistent.

For example, in the case of an HVAC system, cooling and warming cycles may be much closer in timing as the spaces being cooled or heated are more temperature dynamic. In one example, a 5-minute cooling cycle and a 5-minute warming cycle could be an expected normal where factoring a temperature variation could be as follows: The cooling time (when using Air Conditioning in Summer) would be increased as the temperature variation increased due to warmer air being mixed into the space during the cooling cycle. The compressor must also work harder in higher temperatures if placed outside. Further, the warming cycle would be reduced, as the large temperature differential blends warmer air increasing the temperature faster.

So while the 5-minute cool (HVAC On) and 5-minute warm (HVAC Off) cycle may hold for keeping the room at 68° F. when the outside temperature is 80° F., when the outside temperature reaches 100° F., the cycle could adjust to 7-minute cool (HVAC On) and 3-minute warm (HVAC Off). The 20% variance will remain regardless of the calculated cycle times before triggering alerts; however, these cycle times are calculated from the differential. This delta of the outside temperature versus the desired indoor temperature will directly impact the cycle times. Cool time=outside/ inside temp*cool time*X. Warm Time=Inside Temp/Outside temp*cool time*X. Where X is determined based on other external variables such as building materials, insulation, outside facing walls etc. These values are baselined and fine-tuned by the system as it learns the environment of a particular structure.

Figure 9:
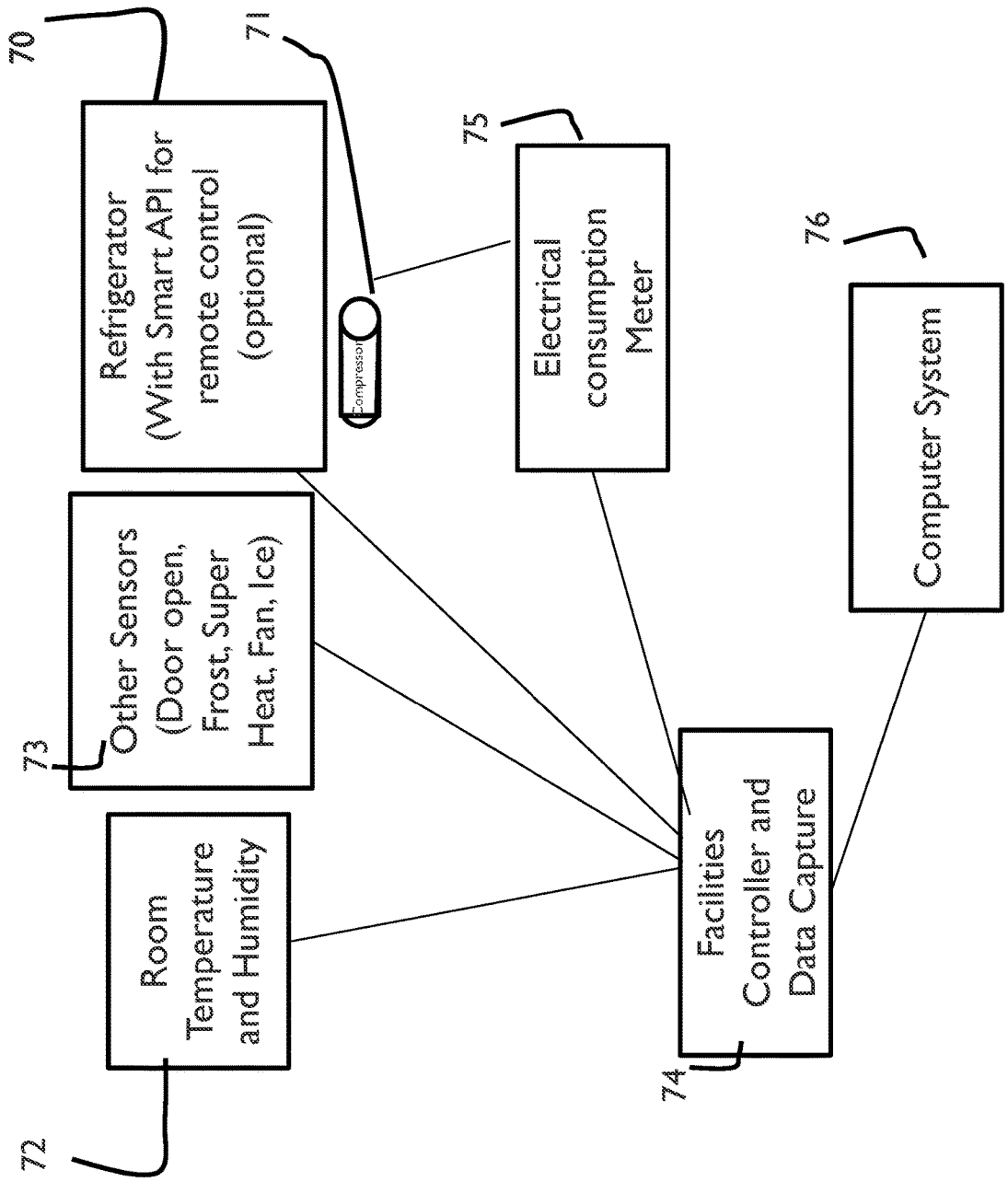
FIG. 9 is a block diagram of an installation with sensors and meters to capture the required data.

Turning to FIG. 9 block diagram is shown of a typical installation of the system for a particular piece of equipment, in this case, a refrigerator (70) with a compressor (71). A power consumption meter (75) is installed, which may be on the power plug, at the power panel or build into the refrigerator. This meter (75) sends data to a local collection device (74), which may comprise a facilities controller, a local computer or an internal storage device with communications capabilities built into the meter (75) itself. Data is sent from the collection device (74) to a computer system (76), which may be remotely located (e.g., in the cloud), or on the premises where the data is then stored and correlated and matched with patterns.

In addition to the power usage data of the refrigerator (70) being captured by the meter (75) and transmitted to the computer (76) through a collection device (74), other sensors, such as, a room temperature and humidity sensor (27) and a door open sensor (73), may be deployed to capture events that could impact adherence to the model. These various sensors (72)(73) send data to a collection device (74), which in turn, sends the data to computer (76). Each event is time stamped so that the correlation of measurement data from all sensors (72,72,75) can be combined.

Types of Problems that can be Discovered. A discussion will now be presented with respect to the measurement and analysis of what kinds of problems can be detected and how these are reacted to by the system as well as how the models are established and vary over time. These examples are provided to illustrate how the system can adapt and learn to adjust for variances over time and variances due to external factors. The system will be able to learn variances that can affect the expected power usage pattern or model. Additionally, as more data is gathered about a particular piece of equipment installed at a particular location, the expected power usage pattern or model will evolve through machine learning and adapt to become more accurate and able to predict problems more quickly.

When deploying devices of a certain type, one can learn from the behaviors of similar devices and build a model from these as a starting point. Ideally, one would have established a model for each piece of equipment using actual measured data that can be used to form a baseline for future installations of such equipment. If no such model exists, the first installation can be used to establish the expected pattern or model, and then subsequent device installations can utilize the first model where the expected power usage pattern established for that particular piece of equipment can be adjusted based on the variances seen assuming the variances are not too great to indicate a malfunctioning piece of newly installed equipment.

Similarly, if a model has been in use or data has been collected over a full or partial lifecycle of a piece of equipment, the expected power usage model may be modified to account for age and normal degradation of the equipment. This age-modified model can then be used to measure against other similar pieces of equipment installed and monitored by the system. As an example, Maytag model 1 refrigerators are installed and monitored over a 10-year period. It is observed that after 9 years, some models are showing degradation that is detected by measuring the power usage. Based on this information, it can be expected that similar degradation will be seen in similar equipment that reach the same point in the lifespan of the particular equipment.

The ability to capture and understand normal power usage cycles and adjust the monitoring to avoid false positives will provide valuable information to companies looking to tightly control energy costs and obtain the most use out of installed equipment without having to deal with the potential negative consequences of using the equipment till catastrophic failure. Additionally, it should be noted that if it is observed that a particular location with particular equipment has the door of a refrigerator open much more often or for substantially longer periods of time than other locations performing similar functions, some benchmarking and comparison can also be accomplished to see where business operations can potentially be improved. While the equipment may be functioning optimally, there may be an opportunity to adjust operating procedures to lower operating costs.

Furthermore, knowing and understanding cycling duration of particular equipment and correlating this with the cost of power usage would allow one to predict and show business owners potential savings through utilization of the currently discussed system.

The following are some parameters that would be advantageous to monitor. These could provide data to adjust the expected power usage pattern or signature, or they could be independent measurements that could be independently monitored so as to lower operating and maintenance costs. These parameters are only provided to be illustrative to allow for a better understanding of some types of data that would be advantageous to gather for processing by the system and are not intended to be limiting.

Vibration Measurement. Symptom: Sensing vibration or shuddering. Action Taken: Reduce speed of Variable Speed Motor; Dispatch service technician to inspect for mechanical wear, loose fasteners, drive belt condition.

High Frequency Sound Measurement. Symptom: Sensing high pitched sound. Process: Correlate with whether compressor has to run longer to reach set point or whether there is increased power usage for the compressor unit, or higher temperature of the compressor unit. Action: Dispatch technician to check refrigerant level, high side head pressure.

Combined Vibration and Sound Measurement. Symptom: sensing high pitched sound and vibration. Process: Correlate with whether equipment is using an increased amount of power to run. Action: dispatch technician for possible belt or bearing replacement.

Sound Measurement. Symptom: ticking sounds emanating from the equipment. Process: Correlate with ice sensor or temperature inside of freezer. Action: initiate defrost cycle to determine if fan is icing up.

Lower Instantaneous Power Consumption.

Symptom: Consuming less electricity at any one point in time. Process: Correlate with inside temperature refrigeration unit. Action: If temperature inside of refrigeration unit is too high, failing or inoperative compressor.

Increased Duration of Power Consumption Cycles.

Symptom: Equipment staying on longer than expected. Process: Correlate with low pitched knocking sound from compressor sensor or high pitched sound (e.g., takes longer to cool—but once cool stays cool). Action: suspect low refrigerant level or faulty compressor.

Increased Frequency of Power Consumption Cycles.

Symptom: Inside temperature of refrigeration unit rising too quickly. Process: Correlate with other sounds. Action: suspect leaky door gasket, open door, or other mechanical failure.

It should be noted that sensors can initially measure all these data points (e.g., sound measurements, vibration measurements, etc.) to generate expected baselines for those measurements. These can then be matched or compared to corresponding measured factors to determine if these measured indicators are within allowed tolerances. For example, when a piece of equipment is first installed, the noise produced by the equipment may be very low and vibration may be minimal. However, as the equipment ages or if it becomes damaged for some reason, changes to these factors could be detected and actions, alerts or even alarms can be generated by the system as needed. The collected data could be used by the system to generate specific actions, alerts or alarms including, for example, the Alarm Name, High Air Temp, Low Air Temp, Excess Defrosts, Super Heat Temp and so on along with a host of different actions to modify the functioning of the equipment.

Figure 10:
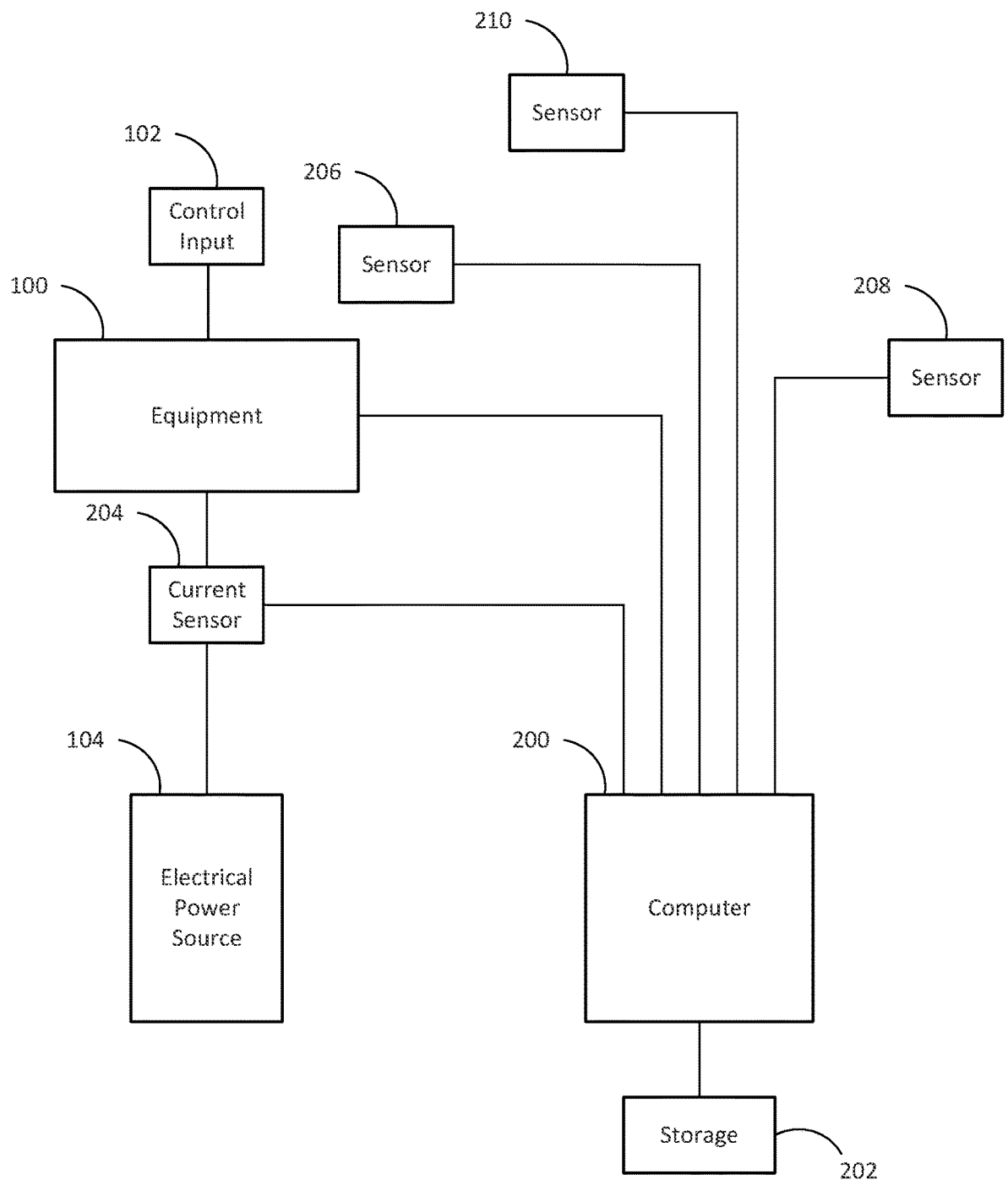
FIG. 10 is a block diagram of the system according to the invention.

Referring to FIG. 10 a block diagram of the system is illustrated including a piece of equipment 100 having a control input 102. The equipment 100 can comprise virtually any type of equipment that is controlled including, for example but not limited to, HVAC equipment, refrigeration equipment, freezer equipment, ovens and baking equipment, industrial equipment, manufacturing equipment and the like. Likewise, the control input 102 can be any type of single device or multiple control devices or processed inputs whether locally or remotely located from the equipment 100.

Also shown in FIG. 10 is computer 200, which could comprise any type of general purpose or special purpose computer capable of receiving and processing data. A storage 202 is accessible by computer 200 and is provided to store data.

Computer 200 is coupled to current sensor 204, which in one embodiment could comprise current transformers for measuring current supplied from electrical power source 104 to equipment 100. The current sensor 204 can comprise any type of current transformers and may measure single phase or three phase current to generate current data that is received by computer 200 and saved in storage 202 with a time stamp. It should be noted that while sensor 204 is labeled as "current" sensor, it is contemplated that sensor 204 could be provided with the ability to measure voltage such that both current and voltage could be instantaneously measured and power usage can be easily determined.

Also depicted in FIG. 10 are sensor 206 and sensor 208. These could comprise virtually any type of sensors providing secondary data such as, environmental temperature in the vicinity of the equipment, exterior air temperature outside the facility, exterior humidity or room occupancy. It is conceived that these could be "dynamic" measurements in that they could be made and transmitted in real-time or close to real time. In this way environmental measurements that can have a real effect on the run time of equipment can be taken into account so that an alarm does not sounds due to the equipment running for a longer (or shorter) period of time based on environmental factors. Alternatively, the sensors could be measuring parameters more directly associated with the equipment that is being measured including, for example, a door sensor, or a vibration detector or the like.

It should be noted that while the computer 100 is shown coupled to equipment 100 and sensor 204, 206, 208, it will be apparent to those of skill in the art that these connections could be hard-wired or they could be wireless connections. Likewise, these various devices could be coupled to each other via a network connection providing maximum flexibility.

Figure 11:
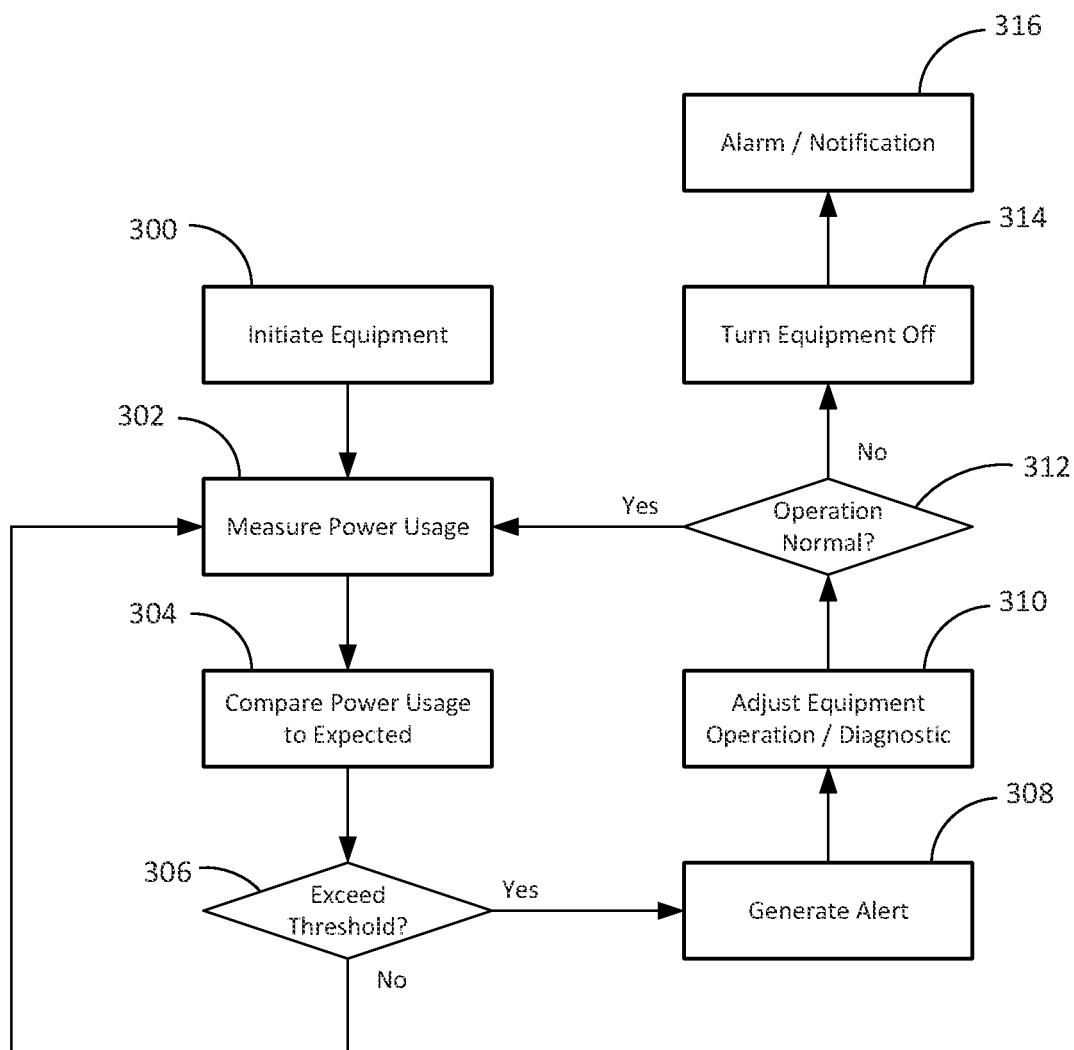
FIG. 11 is a flow and decision diagram of the system according to FIG. 10 illustrating the initiation cycle.

FIG. 11 depicts a flow and decision chart for the initial setting up of equipment by the system. At step 300 the equipment is initiated. From there the system then measures the energy or power usage 302 of the equipment during a calibration time period, which is saved in a storage as an actual power usage signature or pattern. It will be understood by those of skill in the art that the calibration time period may be selected to encompass multiple repeating cycles of operation for the equipment. The sensor may in one configuration measure current, and in another configuration may also measure voltage. However, it is contemplated that the sensor may comprise a device that measure an amount of natural gas or oil consumed by the equipment.

The measured energy or power usage signature is then compared to an expected power usage signature 304. The expected power usage signature could be data received from the factory relating to the expected power consumption characteristics of the equipment. Alternatively, it could comprise a pattern or signature generated by the system based on data input provided by a user. Still further, the expected power usage 304 signature could comprise historical data gathered by the system for an identical piece(s) of equipment monitored in that or another location. In short, the system will compare the measured power usage signature with the expected power usage signature to determine if the actual usage signature exceeds a threshold deviation 306. It is conceived that there are a number of ways in which this can be done, however on way is to match data points between the expected power usage signature and the measured power usage signature. If the plotted points do not exceed a threshold deviation, then the system can proceed with continuously measuring the power usage of the equipment, which will be compared to an expected signature for analysis. It is contemplated that the initial expected power usage signature could be modified by the initial measured power usage signature. For example, the system could go through a number of cycles which may span some time, even over a few days to create a stable running cycle measurement. That data could then be used as the expected power usage signature, or that data could be used to modify the original expected power usage signature. Likewise, while not shown in FIG. 11, gathered historical data could be used to modify the expected power usage signature so that the expected power usage signature accounts for expected degradation of the equipment over time.

Referring back to step 306, if the plotted points deviate too far from the expected power usage, then an alert can be generated 308. This initial alert indicates that something is wrong with the newly installed equipment or newly monitored equipment. The system then has the option to adjust a setting of the equipment and/or run a diagnostic 310. The adjustment could be to slow the equipment to a set percentage of operation. Additionally, the adjustment could be to run the equipment through a full range of diagnostic functions which would allow for the gathering of data as the equipment is operated in various different ways. It is contemplated that in one configuration additional sensors could be used to gather the diagnostic data, which in turn, would be transmitted to a computer for analysis.

After adjusting an operating parameter or running a diagnostic, the system could then measure the operating parameter(s) of the equipment 312. This step could include re-measuring the current the equipment is using or determining that the diagnostic results are sound and no problem exists. If it is determined that no problem exists, the system could then return to the step of measuring the power usage 302 and begin the initial measurement process again.

If, however, it is determined that the equipment is not functionally within normal operating parameters, the system could then turn the equipment off 314. This step could also include the sending of an alarm or a notification of equipment malfunction that could include transmission of the diagnostic data as a report accompanying the alarm notification.

It is further understood that supplemental sensors can provide additional input data relating to the functioning of the equipment. For example, a sensor may indicate that a window in a space served by the equipment is open and/or a temperature sensor in the space may further indicate the temperature is rising. Additionally, a door sensor may indicate that a refrigerator or freezer door is open or ajar and/or a temperature sensor in the refrigerator or freezer may further indicate the temperature is rising despite the operation of the equipment.

Figure 12:
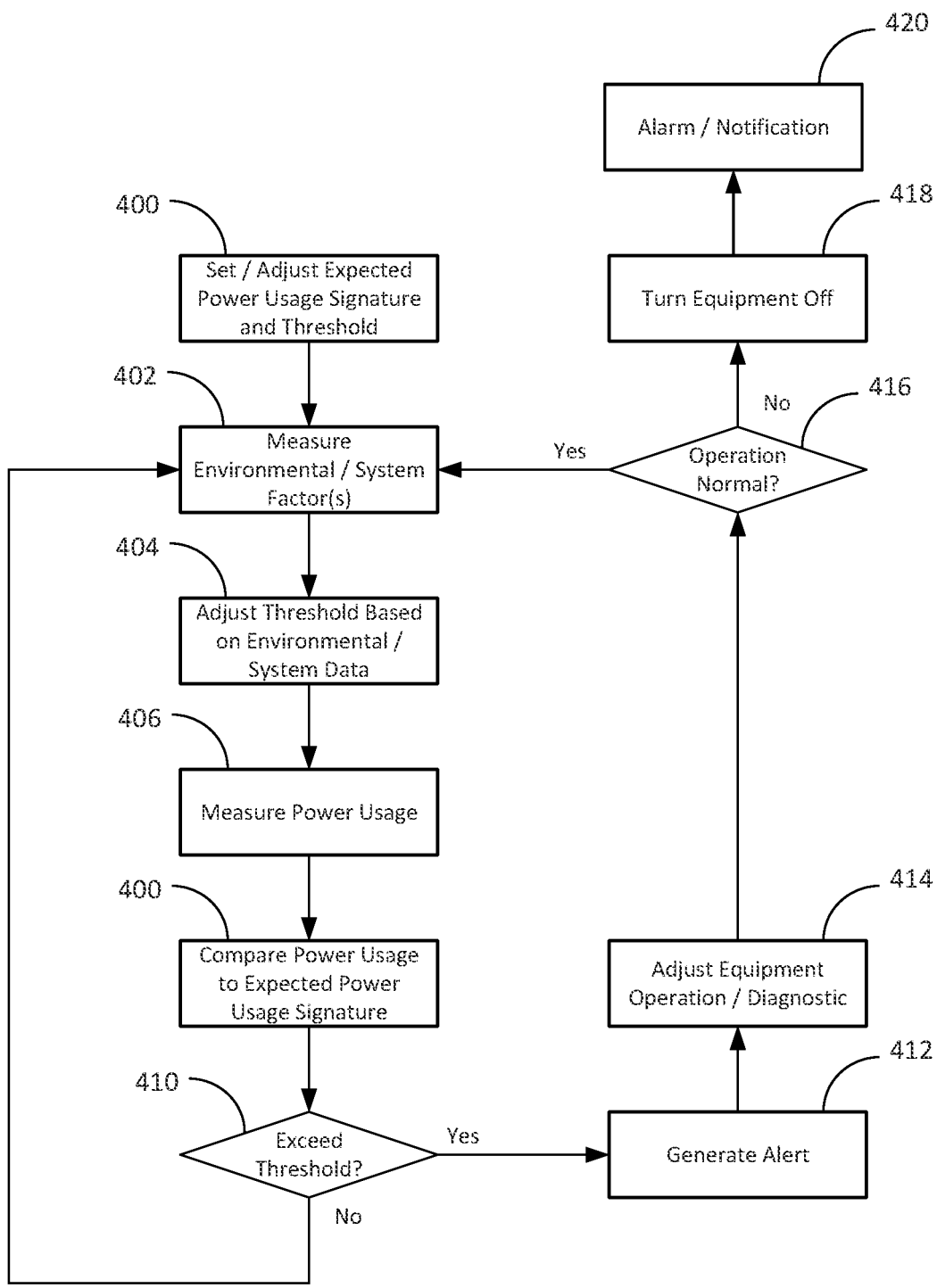
FIG. 12 is a flow and decision diagram of the system according to FIG. 10 illustrating the functioning of the system monitoring the power usage of a piece of equipment.

FIG. 12 is another flow and decision chart according to one aspect of the invention. At step 400, the system sets the expected power usage signature and threshold. This may occur as previously described in connection with FIG. 11. Alternatively, this could be automatically retrieved by the system based on an identification of the piece of equipment that is being monitored. This identification could be due to data input by a user, or it could be by matching of a measured power usage signature with known power usage signatures. Likewise, the threshold deviation could comprise a manually entered or programmed deviation (e.g., ±3% or some other figure), or it could be data provided from the factory or even a range that is generated by the system based on historical data of similar equipment.

Once the expected power usage signature and thresholds are set, the system will then dynamically measure environmental or system factors 402. This could include, for example, accounting for the outside air temperature or for whether a door sensor indicates that a door to a refrigerator is open and the duration of the event. In the first instance, if the equipment being monitored comprises a compressor associated with HVAC equipment, it will be expected that the equipment will have to work longer and more frequently during the hot summer months. The delta (Δ) between the inside air temperature and the outside air temperature will be a factor in adjusting the threshold to not indicate an alert or an alarm based on the fact that the compressor has to work harder to maintain a temperature set point during hot summer months than it does during cool spring or fall months. Likewise, when a door to a walk-in refrigerator or freezer is opened, it can be expected that the temperature inside the refrigerator or freezer will rise and the temperature rise will be commensurate with the duration of the event (e.g., the length of time the door is open). This can be factored in to the threshold value, or it could be that the system in the example of the door open event, will simply discard the cycle data as it is a single non-repeated event unlike the repeated event of the compressor running during hot summer months.

Once the system has measured environmental or system factors 402 and dynamically (in real time or close to real time) adjusted the threshold based on the environmental or system factors 404, the system will proceed with active power usage measurement 406. The measured actual power usage is then compared to the expected power usage signature 408 and a determination is made if the measured usage exceeds the threshold deviation value 410. If the measure power usage does not exceed the threshold value, the system continues to monitor the actual power usage 406.

If, however, it is determined that the measured power usage does exceed the threshold deviation, the system will move to generate and alert 412. It will be understood by those of skill in the art that the alert may be generated when the actual power usage signature indicates that either a higher than expected energy usage is occurring or that that a lower than expected energy usage is occurring. In either situation, the actual energy usage for the equipment exceeds the threshold deviation (above or below the curve) to such an extent that the system determines a problem has developed with the equipment that requires further analysis.

Generation of an alert may comprise a visual indication, an audio indication, a digital message or any combination or the like. If an alert is generated, it is contemplated that the system could then adjust the operation of the equipment or run a diagnostic 414. The adjustment or diagnostic could comprise any type of event as previously described. It is further contemplated that the alert could comprise a text or email message to maintenance personnel that the system needs to be checked. Likewise, the alert could be the automatic transmission to service personnel to make a service call to check the equipment. In one configuration, diagnostic data could be transmitted with the text or email or a link that could be clicked on by the maintenance or service personnel could be provided allowing the individuals to access the system data collected and associated with the equipment in question. This could allow personnel to remotely determine what the current situation is to prioritize service calls and potentially indicating what parts may be needed to be brought to the call if the equipment is malfunctioning.

Alternatively, the adjustment of the equipment could comprise turning the equipment off and re-initializing. Once the system has made the adjustment to the equipment and/or performed a diagnostic, the system then determines if the current measured operation of the system is normal 416. If so, the system then returns to measuring the environmental and system factors and continues the monitoring as previously described to monitor the equipment. If, however, the system does not see the equipment returning to normal expected function, the system may then, depending on the severity of the measured values, turn the equipment off 418 and generate and alarm condition or notification 420. The alarm condition could be indicated by visual, audio or digital messaging to a user or group of users or service personnel. As in the case with the generation of the alert 412, it will be understood by those of skill in the art that the alarm may be generated 420 when the actual power usage signature indicates that either a higher than expected energy usage is occurring or that that a lower than expected energy usage is occurring at step 416.

While the invention is susceptible to various modifications, and alternative forms, specific examples thereof have been shown in the drawings and are herein described in detail. Is should be understood however that the invention is not to be limited to the particular forms or methods or embodiments disclosed.

What is claimed is:

1. A system for automatically learning and adapting to the energy usage of an equipment operating according to a control input, the system comprising:
   a computer having a storage and coupled to a network;
   a sensor coupled to the network and associated with the equipment;

software executing on said computer including an expected energy usage over time signature the equipment is expected to follow during operation for a time period;

said sensor measuring the energy used by the equipment during operation for a measured period of time, said sensor generating energy data based on a measured energy usage for the measured period of time and transmitting the energy data to said computer;

said software generating an actual energy usage over time signature based on the received energy data for the measured period of time;

deviation data saved on said storage comprising a threshold deviation from the expected energy usage over time signature;

said software comparing the actual energy usage over time signature to the expected energy usage over time signature; and wherein when the actual power usage signature exceeds the threshold deviation, said software initiates an action selected from the group consisting of: running the equipment through a diagnostic routine, setting the equipment to a preset level of operation, setting the equipment to a preset duration of operation, turning the equipment off, cycling the equipment, generating an alarm and combinations thereof;

a second sensor comprising an environmental sensor or a system sensor, said second sensor measuring a parameter and generating second sensor data, the second sensor data transmitted to said computer, wherein said software modifies the threshold deviation based on the received second sensor data, wherein when the second sensor is an environmental sensor, the second sensor generates environmental data and is selected from the group consisting of: temperature, humidity, air flow and combinations thereof, or said second sensor comprises; and wherein when the second sensor is a system sensor, the second sensor generates system data and is selected from the group consisting of: a door sensor, an occupancy sensor and combinations thereof.

2. The system according to claim 1, wherein the system operates the equipment for a calibration time period during which the system measures energy consumption and generates energy consumption data, wherein the energy consumption data is used to generate the expected power usage signature.

3. The system according to claim 2, wherein the calibration time period is selected to encompass multiple repeating cycles of operation for the equipment.

4. The system according to claim 1, wherein said sensor comprises a current sensor.

5. The system according to claim 4, wherein the current sensor comprises a current transformer.

6. The system according to claim 5, wherein said sensor further comprises a voltage sensor for measuring an instantaneous voltage provided to the equipment and generating voltage data, wherein said software correlates the current data and voltage data to generate the energy data.

7. The system according to claim 1, wherein the expected energy usage over time signature is based on criteria selected from the group consisting of: a time of day, a date, a geographic location where the equipment is installed, a perm rating of a building in which the equipment is installed, historical usage data for the equipment, an expected degradation in equipment efficiency, and combinations thereof.

8. The system according to claim 1, wherein said software comprises a filter such that the alarm with not be generated until the deviation from the threshold occurs for a minimum number of equipment cycles.

9. The system according to claim 8, wherein the minimum number of cycles is at least two cycles.

10. The system according to claim 8, wherein the minimum number of cycles is programmable.

11. The system according to claim 1, wherein the expected energy usage over time signature is reflective of cycling of the equipment including: a frequency in the cycling of the equipment, a duration of each cycle, a magnitude of energy usage during each cycle, and combinations thereof.

12. The system according to claim 1, wherein the modification of the threshold by the software occurs dynamically.

13. The system according to claim 1, wherein the alarm is generated when the actual power usage signature indicates: a higher than expected energy usage that exceeds the deviation threshold, a lower than expected energy usage that exceeds the deviation threshold, and combinations thereof.

14. A system for automatically learning and adapting to the energy usage of an equipment operating according to a control input, the system comprising:

a computer having a storage and coupled to a network;

a sensor coupled to the network and associated with the equipment;

said sensor measuring the energy used by the equipment during operation for a first time period, said sensor generating first time period energy data based on the measured energy usage during the first time period and transmitting the first time period energy data to said computer;

software executing on said computer generating an energy usage over time baseline based on the received first time period energy data;

deviation data saved on said storage comprising a threshold deviation from the energy usage over time baseline;

said sensor measuring the energy used by the equipment during operation for a second time period, said sensor generating second time period energy data based on the measured energy usage during the second time period and transmitting the second time period energy data to said computer;

wherein when the second time period energy data exceeds threshold deviation, said software initiates an action selected from the group consisting of: running the equipment through a diagnostic routine, setting the equipment to a preset level of operation, setting the equipment to a preset duration of operation, turning the equipment off, cycling the equipment, generating an alarm and combinations thereof;

a second sensor comprising an environmental sensor or a system sensor, said second sensor measuring a parameter and generating second sensor data, the second sensor data transmitted to said computer wherein said software modifies the threshold deviation based on the received second sensor data;

wherein when the second sensor is an environmental sensor, the second sensor generates environmental data and is selected from the group consisting of: temperature, humidity, air flow and combinations thereof, or said second sensor comprises; and wherein when the second sensor is a system sensor, the second sensor generates system data and is selected from the group consisting of: a door sensor, an occupancy sensor and combinations thereof.

15. The system according to claim 14, wherein said software comprises a filter such that the alarm with not be generated until the deviation from the threshold occurs for a minimum number of equipment cycles.

16. The system according to claim 15, wherein the minimum number of cycles is at least two cycles.

17. The system according to claim 15, wherein the minimum number of cycles is programmable.

18. The system according to claim 14, wherein the alarm is generated when the actual power usage signature indicates: a higher than expected energy usage that exceeds the deviation threshold, a lower than expected energy usage that exceeds the deviation threshold, and combinations thereof.

19. The system according to claim 14, wherein said sensor comprises a current sensor.

20. The system according to claim 19, wherein the current sensor comprises a current transformer.

21. The system according to claim 20, wherein said sensor further comprises a voltage sensor for measuring an instantaneous voltage provided to the equipment and generating voltage data, wherein said software correlates the current data and voltage data to generate the energy data.

22. The system according to claim 14, wherein the expected energy usage over time signature is based on criteria selected from the group consisting of: a time of day, a date, a geographic location where the equipment is installed, a perm rating of a building in which the equipment is installed, historical usage data for the equipment, an expected degradation in equipment efficiency, and combinations thereof.

23. The system according to claim 14, wherein the expected energy usage over time signature is reflective of cycling of the equipment including: a frequency in the cycling of the equipment, a duration of each cycle, a magnitude of energy usage during each cycle, and combinations thereof.

24. The system according to claim 14, wherein the modification of the threshold by the software occurs dynamically.

* * * * *